United States Patent [19]
Swann et al.

[11] Patent Number: 5,526,715
[45] Date of Patent: Jun. 18, 1996

[54] INDEXIBLE WORKHOLDING APPARATUS

[75] Inventors: George R. Swann, Gibsonia; Eric R. Moore, Pittsburgh, both of Pa.

[73] Assignee: Chick Machine Tool, Inc., Warrendale, Pa.

[21] Appl. No.: 407,902

[22] Filed: Mar. 21, 1995

Related U.S. Application Data

[63] Continuation-in-part of Ser. No. 300,606, Sep. 2, 1994.
[51] Int. Cl.$^6$ .............................. B23Q 3/18; B23Q 16/02
[52] U.S. Cl. .................. 74/822; 192/8 R; 269/43; 269/63; 269/152; 269/900; 269/5
[58] Field of Search ...................... 74/822; 192/8 R; 279/5, 110; 269/43, 63, 152, 900

[56] References Cited

U.S. PATENT DOCUMENTS

| | | | |
|---|---|---|---|
| 731,871 | 6/1903 | Echols . | |
| 2,339,986 | 1/1944 | Engert | 90/56 |
| 2,369,425 | 2/1945 | Becker | 90/59 |
| 2,406,043 | 8/1946 | Sorensen | 33/174 |
| 2,952,169 | 9/1960 | Johnson | 74/822 |
| 3,020,998 | 2/1962 | Webb | 198/210 |
| 3,162,064 | 12/1964 | Musy | 74/822 |
| 3,204,490 | 9/1965 | Jones et al. | 74/822 |
| 3,814,448 | 6/1974 | Buck | 279/110 X |
| 4,184,691 | 1/1980 | Esser et al. | 279/5 X |
| 4,524,655 | 6/1985 | Waldron et al. | 82/36 A |
| 4,643,411 | 12/1987 | Izumi | 269/153 |
| 4,884,474 | 12/1989 | Kawata | 74/813 L |
| 4,921,378 | 5/1990 | Kytöllä | 409/221 |
| 4,936,559 | 6/1990 | Diaz Torga | 269/69 |
| 4,991,463 | 2/1991 | Kawata | 74/817 |
| 5,064,321 | 11/1991 | Barnes | 409/219 |
| 5,094,436 | 3/1992 | Stephan, III | 269/153 |
| 5,136,896 | 8/1992 | Burka | 279/5 X |

OTHER PUBLICATIONS

Chick Vise Fixturing Brochure, Chick Machine Tool Inc. 1992.
Chick Multi–Lok/8 Brochure, Chick Machine Company, Inc. 1989.
Chick Multi–Lok Workholding For Your Mazak Brochure, Chick Machine Tool Inc., 1992.
Chick Multi–Lok; The Workholding System For Your Tsugami Brochure, Chick Machine Tool Inc., 1992.
Chick Multi–Dex Brochure, Chick Machine Tool Inc., 1993.
Chick Quick Change Workholding Brochure, Chick Machine Tool Inc., 1993.
Chick M–Series Brochure, Chick Machine Tool, Inc., Aug. 1993.
Endicon Precision Index and Coupling Rings Brochure, ITW Spiroid, 1987.

*Primary Examiner*—Rodney H. Bonck
*Assistant Examiner*—Troy Grabow
*Attorney, Agent, or Firm*—Kirkpatrick & Lockhart

[57] ABSTRACT

An indexable workholding apparatus. The apparatus has a column member with at least one pair of workholding jaws operably attached thereto. The column member is rotatably and axially supported on a shaft member that is operably attached to an indexing assembly. The indexing assembly is constructed to axially displace the column along a longitudinal axis to a disengaged position upon the initial application of a rotary force to the shaft member. When in the disengaged position, the column can be selectively rotated about the axis by the further application of rotary force to the shaft member so that the column may be positioned in a predetermined angular position. A damping apparatus is attached to the shaft member and column for damping the return axial and rotary motion of the column and shaft member when the application of rotary force is discontinued. The indexing apparatus further includes a device for locking the article in a plurality of predetermined angular positions when the application of rotational force to the indexing assembly is discontinued.

9 Claims, 13 Drawing Sheets

INDEXIBLE WORKHOLDING APPARATUS

BACKGROUND OF THE INVENTION

This application is a continuation-in-part application of U.S. patent application Ser. No. 08/300,606, filed on Sep. 2, 1994.

1. Field of the Invention

The present invention relates to indexing apparatuses and, more particularly, is directed to indexable apparatuses for selectively orienting objects such as workholding devices in precise predetermined positions.

2. Description of the Invention Background

A number of different apparatuses have been developed for indexing a variety of articles between manufacturing operations to increase the efficiency of the manufacturing process. For example, various types of indexing apparatuses are typically used to accurately present a workpiece in a predetermined orientation relative to the spindle of a machining device such as a milling machine or the like.

One type of such indexing device is disclosed in U.S. Pat. No. 2,339,986 to Engert. The device in that patent comprises an indexable device for indexing a shaft into a variety of different machining orientations about a single axis. While this device advantageously can support a shaft in various orientations to enable, for example, keyways to be cut in different locations on the shaft, the device can only hold a single shaft at a time and is ill-suited for supporting non-cylindrical workpieces.

Another indexable device is disclosed in U.S. Pat. No. 3,020,998 to Webb. That device comprises a turntable adapted to be indexed by the cyclic operation of a ratchet and pawl mechanism. A plurality of vise-like workholders are supported on the table and are adapted to be indexed about an axis such that the workholders can be positioned in various orientations relative to metal bending or crimping apparatus. This device, however, can only support workpieces in a single planar orientation about the device's axis. Moreover, the ratchet and pawl system cannot be used to index the workholders to very precise and minute different angular orientations.

U.S. Pat. No. 2,369,425 to Becker discloses an indexable workholding device that comprises a frame that is adapted for attachment to the machining table of a machining device such as drill press. A disk is rotatably attached to the frame and may be rotated about an axis and secured in a predetermined position by clamping members attached to the frame. The top of the disk is also configured to accept workpiece holding clamps thereon. The outer edge of the disc is provided with a vernier scale that cooperates with an indicator on the frame to very precisely indicate the rotational position of the disc relative to the frame. The workpiece accuracy is dependent upon the secure clamping of the disk in position and the secure clamping of the workpiece on the disk. If either the workpiece or the disk moves even slightly, the workpiece accuracy will be compromised. A similar apparatus for retaining workpieces at selective angles is also disclosed in U.S. Pat. No. 2,406,043 to Sorensen. That device also comprises a rotatable plate member that is equipped with a plurality of threaded apertures adapted to receive workholding clamping members therein. Although this device is capable of indexing a workpiece at relatively precise angular orientations, if the clamping assemblies attaching the workpiece move, the workpiece accuracy is compromised.

All of the above indexing apparatuses have limitations. In particular, those apparatuses that can position an item or workpiece in a relatively accurate position are generally incapable of supporting the workpiece in a very accurate and rigid position when it has external forces, such as those typically generated by various machine tools, assembly apparatuses or other manufacturing devices applied thereto. Such indexing apparatuses that do provide an adequate degree of rigidity typically cannot achieve the desired positioning accuracy or they are expensive to manufacture and maintain.

A number of indexing apparatuses typically can only index items about a vertical or horizontal axis or they can only index items that are received or oriented in a common plane. Such indexing apparatuses are not well suited for use in those applications wherein it is desirable to present multiple surfaces of multiple workpieces to the spindle of a machining device. It will be appreciated that by indexing a workpiece relative to the spindle of a machining device, several workpiece surfaces typically may be machined without the necessity of removing the workpiece from the workholder and re-clamping it in other machining orientations.

One device that addresses this problem is manufactured by Chick Machine Tool, Inc. of 800 Commonwealth Drive, Warrendale, Pa. 15086 under the trademark "Multi-Lok". This device comprises a vise-like clamping assembly that is equipped with first and second movable jaw supports to which first and second jaw members may be removably attached. A fixed center jaw is attached between the movable jaws to provide two workpiece holding stations. Multiple two-station clamping assemblies can be received on a common column member that has a plurality of slide receiving slots therein. A column supporting base plate can be selectively attached to end of the column to enable the column to be attached to an indexable workholding table and thus enable the column to be selectively rotated relative to the spindle of, for example, a horizontal CNC milling machine. Such device, however, relies on an indexing mechanism that is a part of the milling machine. As such, it cannot be used to index workpieces on other machining devices that are not equipped with such indexable support members.

Another multiple workholding device manufactured by Chick Machine Tool, Inc., under the trademark "Multi-Dex", is also well-suited for clamping and selectively indexing a plurality of workpieces within the machining envelope of a machining device. This workholding device, in general, comprises a column member that supports a plurality of vise-like clamping assemblies that are similar to the Multi-Lok assemblies described above. However, the column member has a base plate formed thereon or attached thereto that may be attached to a selectively indexable support apparatus. Examples of selectively indexable supports are disclosed in U.S. Pat. Nos. 4,991,463 and 4,884,474 both to Kawata. Such assembly can be automatically indexed without the aid of hydraulic or electrical power, simply by contacting an actuator member with the machining device's spindle or the cutting tool that is attached thereto. When a single two-station workholding device is indexed, the two workpieces retained therein can be machined on multiple sides before they must be removed from the workholder. Because the workholders described immediately above provide means for indexing four two-station workholders, a total of twenty four machining sequences (two workpieces/workholder×three sides/workpiece yields six exposed sides for machining sequences×four workholders) can be performed before the workpieces have to be removed from the workholders to be reoriented if necessary. Such device therefore increases the machine operator's "walk away" time (i.e., the time the machine can advance through pre-programmed machining sequences without the aid of an operator to relocate or reposition the workpiece(s)) and, thus, increases the machining apparatus' efficiency. However, this device is adapted to be actuated by the machining apparatus itself and, thus, is not well adapted for manual actuation. Moreover, due to the types of gears used to lock the workholder in various angular positions, very precise accuracies of, for example, ±three arc seconds, cannot be achieved.

In addition, for an indexing apparatus to be manually operated, the apparatus must be designed such that it can be actuated by a force that can be easily manually generated as with a rotatable wheel. However, it is generally desirable for the apparatus to be retained or locked in a desired position with the greatest practical force so that the device cannot be accidently jarred or moved during the machining process. To achieve a balance between these objectives, the indexing device may employ actuation apparatus for providing a mechanical advantage which permits relatively large "locking" or retaining forces to be manually exceeded so that the indexing device can be manually actuated.

The indexing device that is the subject of the parent application (U.S. application Ser. No. 08/300,606) to this application is well-suited for both manual and automated actuation due to its unique and novel design. That device not only possesses relatively large locking forces for retaining the device in a desired position, but it can also be actuated by a manually generated rotary force such as by means of a wheel. However, due to the relatively large locking forces that are generated by such device, it is desirable to control the application of such locking forces after the rotary force has been discontinued to prevent possible injury to the operator or damage to the apparatus when the locking forces cause the reverse rotation of the wheel.

Thus, there is a need for an apparatus capable of indexing one or more items to very precise orientations about an axis that can also rigidly retain such items in that orientation when the items are under the influence of external forces.

There is a further need for an indexing apparatus that has the above-mentioned attributes that is relatively inexpensive to manufacture and maintain.

There is yet another need for an indexing apparatus that can be can be easily adapted to index items about a horizontal or a vertical axis.

There is a need for an indexable workholding apparatus that can selectively support a plurality of workpieces or workholders in very accurate angular orientations.

There is a further need for an indexable apparatus that can be easily used in connection with a variety of different machining apparatuses.

There is another need for an indexing apparatus that can be locked in a desired position during the machining process and that can be actuated by a machine generated or manually generated rotary force.

There is still another need for apparatus for damping the application of the locking forces of an indexable apparatus after the rotary actuation force has been removed therefrom.

SUMMARY OF THE INVENTION

In accordance with a particular preferred form of the present invention, there is provided an indexable workholding apparatus. The apparatus, in a preferred form, comprises a longitudinal column member that has a first longitudinal axis and operably supports at least one pair of selectively movable jaw members thereon. Each pair of selectively movable jaw members are selectively movable along a corresponding second longitudinal axis that is substantially parallel to the first longitudinal axis of the column member. A shaft member extends through the longitudinal column member to enable the column member to be rotated and axially advanced thereon. The shaft member has means for receiving a rotary force, such as from a handle, and is rotatably and axially supported within the column member such that the shaft member and the longitudinal column member can be selectively axially and rotatably advanced about the longitudinal axis. An indexing assembly is attached to the second support member and has displacement apparatus that attaches to the longitudinal column member and the shaft member. The displacement apparatus serves to selectively axially displace the column member in a first longitudinal direction to a disengaged position upon the initial application of a rotary force to the shaft member. The displacement means also permits the column member and shaft member to thereafter be selectively rotated to a predetermined angular position about the longitudinal axis upon the further application of the rotary force to the shaft member. The displacement means displaces the column member in a second axial direction along the shaft member and rotates the shaft member in a second rotary direction to permit said column member to be retained in the predetermined angular orientation by the indexing assembly when the further application of rotary force is discontinued. The apparatus also includes damping apparatus that is attached to the shaft member and the column member for damping the axial travel of the column member in the second axial direction and the rotation of the shaft member in the second rotary direction to a predetermined rate when the further application of rotary force is discontinued to retard the counter-rotation of the wheel and minimize any risk of injury to an operator.

Thus, it is an object of the present invention to provide an indexable apparatus that can be used to index a variety of different articles about an axis to very precise angular orientations.

It is another object of the present invention to provide an indexable apparatus with the above-mentioned attributes that can rigidly retain the article(s) attached thereto in the predetermined angular orientation(s).

It is yet another object of the present invention to provide an indexable workholding apparatus that can selectively support a plurality of workpieces within the machining envelope of a machining device at very precise angular orientations.

It is a further object of the invention to provide an indexable workholding apparatus that can be easily manually indexed to very precise angular orientations.

It is yet another object to provide a device that can be easily transported and used in connection with a variety of different machining devices.

It is still another object of the present invention to provide an indexable workholding device that employs means for damping the axial and rotary travel of the device and the device's actuation means to a predetermined rate when the application of the rotary actuation force thereto is discontinued.

Accordingly, the present invention addresses the foregoing problems associated with other indexable apparatuses. The present invention also enables a plurality of workpieces to be selectively indexed to and firmly retained in very precise angular orientations relative to the spindle of a machining apparatus. Thus, the present invention serves to further maximize the use of the machining envelope and thereby minimizes the amount of machine downtime encountered when using other devices. The subject invention can be easily actuated by the manual application of force thereto and thus does not require the machine tool device to provide the actuation force. In addition to those advantages, other details, objects, and advantages will become apparent as the following detailed description of the present preferred embodiments hereof proceeds.

BRIEF DESCRIPTION OF THE DRAWINGS

In the accompanying drawings, there is shown present preferred embodiments of the invention wherein like reference numerals are employed to designate like parts and wherein.

DETAILED DESCRIPTION OF PREFERRED EMBODIMENTS

Figure 1:
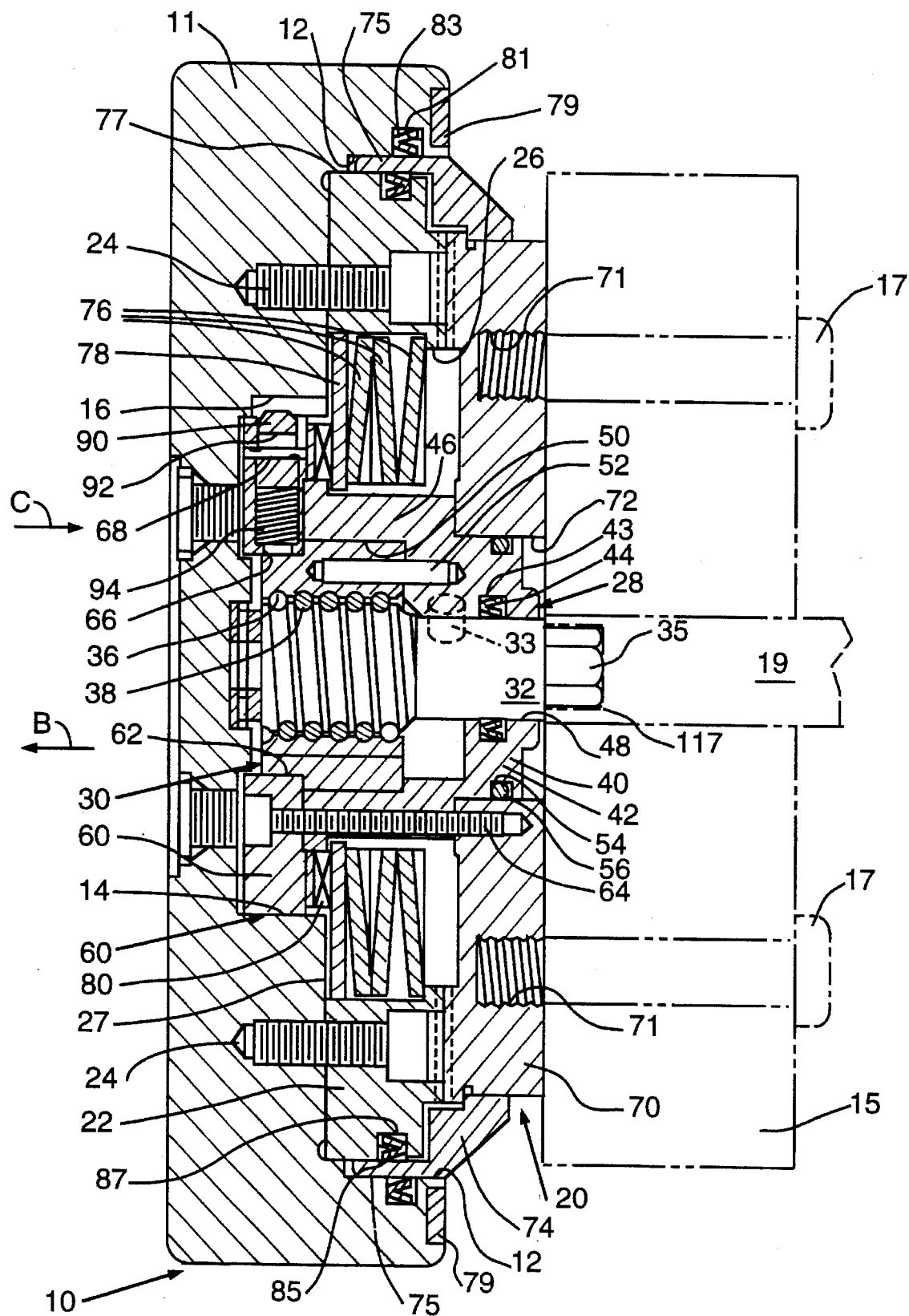
FIG. 1 is top cross-sectional view of a preferred indexable device of the subject invention with the indexing assembly thereof in an engaged position, with some of the elements thereof shown in full view for clarity.
Figure 2:
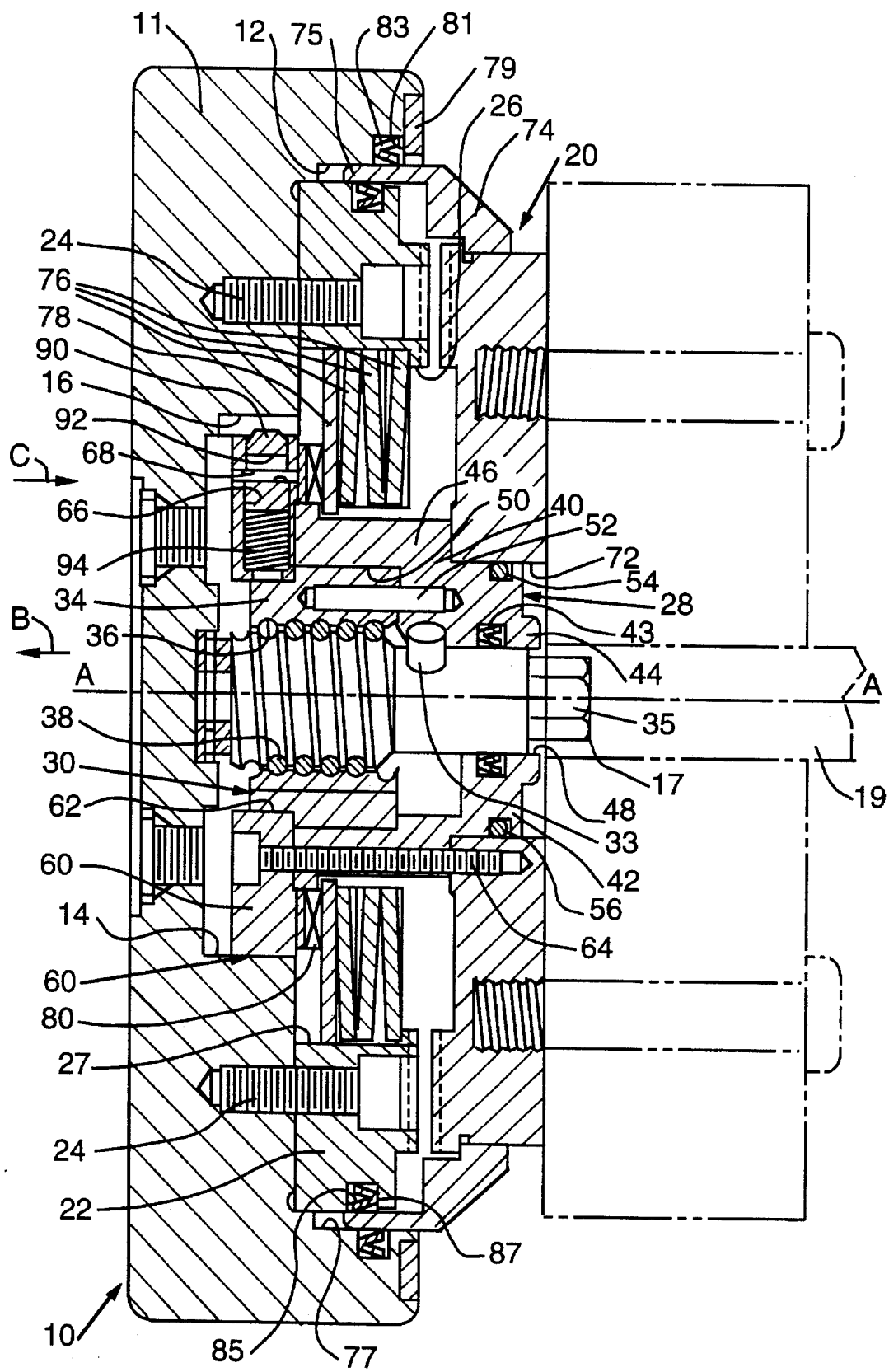
FIG. 2 is another cross-sectional view of the indexable device of FIG. 1 with the indexing assembly thereof in a disengaged position, with some of the elements thereof shown in full view for clarity.

Referring now to the drawings for the purposes of illustrating present preferred embodiments of the invention only and not for purposes of limiting the same, FIGS. 1 and 2 illustrate a preferred indexable apparatus 10 that has a housing 11 that can be operably attached to a variety of different support structures (not shown) to orient the device's axis of rotation "A—A" in a desired orientation. As the present Detailed Description of Preferred Embodiments proceeds, the reader will appreciate that the present indexable device 10 may be used in a variety of different applications wherein it is desirable to index an item or a plurality of items about an axis at preferred increments of, for example, 5° at a very high accuracy of, for example, approximately ±three arc-seconds.

More particularly and with reference to FIGS. 1 and 2, the present indexing apparatus 10, in a preferred form, includes an indexing coupling 20 commonly known in the art as a "Curvic-type" or "Hirth-type" coupling. The indexing coupling 20 comprises a first indexing or toothed ring 22 and a second indexing or toothed ring 70 adapted for meshing engagement with the first toothed ring 22. As can be seen in FIGS. 1 and 2, an object 15 that is to be indexed is non-rotatably attached to the second toothed ring 70 preferably by cap screws 17 that are received in threaded bores 71 in the second toothed ring 70. The skilled artisan will appreciate that object 15 can comprise a variety of different items such as, for example, workholders for holding one or more workpieces therein. It will be further appreciated that the object 15 may be attached to the second toothed ring 70 by other suitable methods without departing from the spirit and scope of the present invention.

The first toothed ring 22 is attached to the housing 11, preferably by cap screws 24 and has two bores (26, 27) therein that are coaxially aligned on axis "A—A". Coaxially received within the bores (26, 27) is a displacement assembly, generally designated as 28. The displacement assembly 28 comprises, among other things, a ball screw assembly 30, a ball screw support ring 40 and a retaining plate assembly 60. The construction and operation of the ball screw assembly 30 is well known in the art and, therefore, will not be discussed in great detail herein. In general, however, the ball screw assembly 30 comprises a screw member 32 that is rotatably housed within a ball nut 34. The ball nut 34 and the screw member 32 have helical grooves therein that cooperate to form helical passages, generally designated as 36, that house a plurality of balls 38 therein. Rotation of the screw member 32 will cause it to be axially advanced relative to the ball nut 34. In addition, screw member 32 has a radially extending engagement pin 33 attached thereto that, as will be discussed in further detail below, is designed to limit the rotation of the screw member 32 to an angular path of approximately 270° about axis "A—A".

The ball screw assembly 30 is supported within a bore 14 provided within the housing that is coaxially aligned on axis "A—A" by the ball screw support ring 40. In particular, as shown in FIGS. 1 and 2, the ball screw support ring 40 has a first hub portion 42 and a second hub portion 46. The first hub portion 42 has a first coaxial bore 48 therein that is sized to slidably and rotatably receive the screw member 32 and the second hub portion 46 has a second coaxial bore 50 that is sized to receive the ball nut 34. Ball nut 34 is non-rotatably attached to the ball screw support ring preferably by pin 52. To prevent chips and other debris from becoming lodged between the first hub portion 42 and the screw member 32, a groove 43 is provided in the first hub portion 42 for receiving a commercially available resilient wiper member 44 therein.

As can also be seen in FIGS. 1 and 2, a retaining plate assembly 60 is received on the ball nut 34. In particular, the retaining plate assembly 60 has a bore 62 therethrough that is adapted to receive a portion of the ball nut 34 therein. A plurality of capscrews 64 serve to attach the retaining plate assembly 60 to the ball screw support ring 40. Also in a preferred embodiment, the second toothed ring 70 of the indexing coupling 20 has a bore 72 therethrough and is adapted to be coaxially received on the first hub portion 42 of the ball screw support ring 40 such that the teeth thereof are in a confronting intermeshing orientation with the teeth of the first toothed ring 22. To prevent chips and debris from entering between the bore 72 of the second toothed ring 70 and the first hub portion 42 of the ball screw support ring 40, a groove 54 is provided around the perimeter of the first hub portion 42 for housing an O-ring 56 therein.

The first and second toothed rings (22, 70) are preferably biased into meshing engagement by a plurality of Belleville washers 76 that are received on the second hub portion 46 as shown in FIGS. 1 and 2. Preferably three Belleville washers 76, sized to create a meshing force of approximately 2000 pounds, are coaxially received with a thrust washer 78 in bore 27 of the first toothed ring 22. As can also be seen in FIGS. 1 and 2, a bearing member 80 is received on the second hub portion 46 of the ball screw support ring 40 between the retaining plate assembly 60 and the thrust washer 78 to provide rotational support to the thrust washer 78 and, ultimately, to the displacement assembly 28.

As shown in FIGS. 1 and 2, the screw member 32 may be advantageously provided with a hexagonal shaped protrusion 35 that is sized to receive a hexagonal shaped cavity 117 of an actuator shaft 19 that is rotatably supported within the object 15 by known means. As the present Description proceeds, the skilled artisan will appreciate that the present indexing device 10 may be easily manually actuated by rotating the actuator shaft 19 in a clockwise direction, as with a hand wheel or other known means, thus rotating the ball screw member 32. However, ball screw member 32 may be selectively rotated by a number of other manual or other automated devices (i.e. motors, etc.) and, therefore, the scope of protection afforded to the claims hereof should not be limited by the source of actuation power that is applied to the ball screw member 32.

Also in a preferred embodiment, to provide an indication of the angular position of column 50 about axis "A—A", an angular scale member 74 is attached to the perimeter of the second toothed ring 70 such that it travels therewith. The scale member 74 is also provided with an annular portion 75 that is adapted to be selectively received within an annular space 77 between the inner surface of cavity 12 and the outer perimeter of the first toothed ring 22. In addition, one or more angular indicators 79 are attached to the housing 11 and cooperate with the scale member 74 to provide the operator with a visual indication of the angular position of the second toothed ring 70 and, ultimately, the object 15.

Preferably received within an annular groove 81 in the housing 11 is a commercially available wiper member 83. A second wiper member 87 is preferably received in annular groove 85 in the perimeter of the first toothed ring 22. As will be discussed in further detail below, wipers (83, 87) serve a two-fold purpose; namely, to prevent chips and debris from entering into the cavity 77 and to provide a sufficient amount of frictional force to retain the second toothed ring 70 in a momentary "disengaged" position as the ball screw member 32 is being rotated through the final portion of its radial path.

In particular, the operation of the indexable device 10 is, essentially, a two step process and can be understood from further reference to FIGS. 1 and 2. FIG. 1 illustrates the displacement assembly 28 in an "engaged" position wherein the first and second toothed rings (22, 70) are biased into meshing engagement by the force created by the Belleville springs 76. Thus, to index the object 15, the second toothed ring 70 must first be axially advanced out of meshing engagement with the first toothed ring 22. To accomplish that task, a rotational actuation force is initially applied to the actuator shaft 19 to cause it to rotate in a clockwise direction about axis "A—A". The initial rotation of the shaft 19 in a clockwise direction causes the ball screw member 32 to also rotate in a clockwise direction. The screw member 32 is rotated through a preferred 270° path of rotation that is limited by the engagement of the engagement pin 33 with a portion of the first hub member 40. Because the axial motion of the ball screw member 32 is restrained in the "B" direction by the housing 11, such rotation of the ball screw member 32 causes the ball nut 34 to axially advance in the "C" direction, thus disengaging the second toothed ring 70. In a preferred embodiment, the ball screw assembly 30 is so arranged such that, just prior to the engagement of the engagement pin 33 with the first hub portion 40 (i.e., when the screw member 32 has rotated through a path of approximately 250°), the screw member 32 will have axially advanced the ball nut 34 in a "C" direction against the force generated by the Belleville springs 76 to thereby cause the first and second toothed rings (20, 70) to be disengaged. See FIG. 2. It will be appreciated that the ball screw assembly 30 is sized to provide the requisite mechanical advantage to sufficiently compress the Belleville springs 76 to permit the second toothed ring 70 to be biased out of meshing engagement. As was mentioned above, in a preferred embodiment, the Belleville springs 76 are preferably sized to provide approximately 2000 pounds of meshing force to the first and second toothed rings (22, 70). However, the Belleville springs 76 and the ball screw assembly 30 may be appropriately sized to provide any other suitable meshing force.

In a preferred embodiment, the wipers (83, 87) are sized and so positioned relative to the annular portion 75 of the scale 74 to create an amount of frictional rotational forces therebetween (i.e., approximately 10 ft-pounds) that is somewhat greater than the rotational force required to operate the ball screw member 32. The frictional forces serve to overcome the forces required to operate the ball screw member 32 including the forces created by the Belleville springs which would otherwise cause the second toothed ring member 70 to axially move in the "B" direction and possibly contact the first toothed ring 22 while the screw member 32 is further rotated through the final portion of its preferred 270° radial path (i.e., until the engagement pin 33 engages the first hub 40). When the engagement pin 33 engages the first hub 40, it causes the displacement assembly 28 to be selectively rotated on the bearing 80 and thereby, by virtue of its connection to the second toothed ring 70, causes the second toothed ring 70 and, ultimately, the object 15 to be rotated about the axis "A—A". It will be understood that while the frictional rotational force generated by the wipers (83, 87) is sufficient to overcome the rotational force required to operate the ball screw 32, such frictional force may be easily overcome by the further manual application of rotary force on the ball screw member 32. The skilled artisan will recognize, however, that other mechanisms may be used to provide the requisite frictional force without departing from the spirit and scope of the present invention. After the object 15 has been rotated to a desired position, the shaft 19 is slowly permitted to turn in a counterclockwise direction under the biasing force of the Belleville springs 76 which causes the second toothed ring 70 to re-engage the first toothed ring 22 and thus, rigidly retain the object 15 in that position.

In a preferred embodiment, a cavity 14 in the housing member 11 is provided with engagement notches 16 therein preferably arranged at 90° intervals, however, any number of engagement notches 16 may be provided in the inner wall of the cavity 14. The engagement notches 16 are adapted to receive therein one or more spring-biased detent pins 90 that are received within the retaining plate assembly 60. More particularly, one or more radial bores 66 are provided in the outer perimeter of the retaining plate assembly 60 and are sized to slidably receive therein a corresponding detent pin 90. Preferably, each detent pin 90 has an oversized transverse bore 92 therethrough that is adapted to receive a transverse pin member 68 attached to the retaining plate assembly 60 as shown in FIGS. 1 and 2. The reader will appreciate that the transverse pin 68 serves to movably retain the detent pin 90 within the radial bore 66. A spring 94 is provided between the detent pin 90 and the bottom of the bore 66 to bias the detent pin 90 in an outward radial direction to engage an engagement notch 16 in the housing 11. It will be appreciated that when the end of the detent pin 90 is received within one of the notches 16, the indexing assembly 28 is further locked in that radial position. Preferably, the end of the detent pin 90 is substantially rounded such that it can be biased out of engagement with a notch 16 when the indexing assembly 28 is rotatably actuated.

As can be seen in FIGS. 3–9, the indexing device 10 of the present invention can also be most advantageously used in connection with a workholding column member 150 to create a selectively indexable workholding assembly 200 that can be attached to a grid plate 130 in a precise position for supporting a plurality of workpieces in various machining orientations relative to a machining device (not shown). It will be further appreciated that such grid plate 130 is adapted to be fastened to the milling table (not shown) of a machining apparatus such as a milling machine (not shown) by known fastening and locating means.

Figure 3:
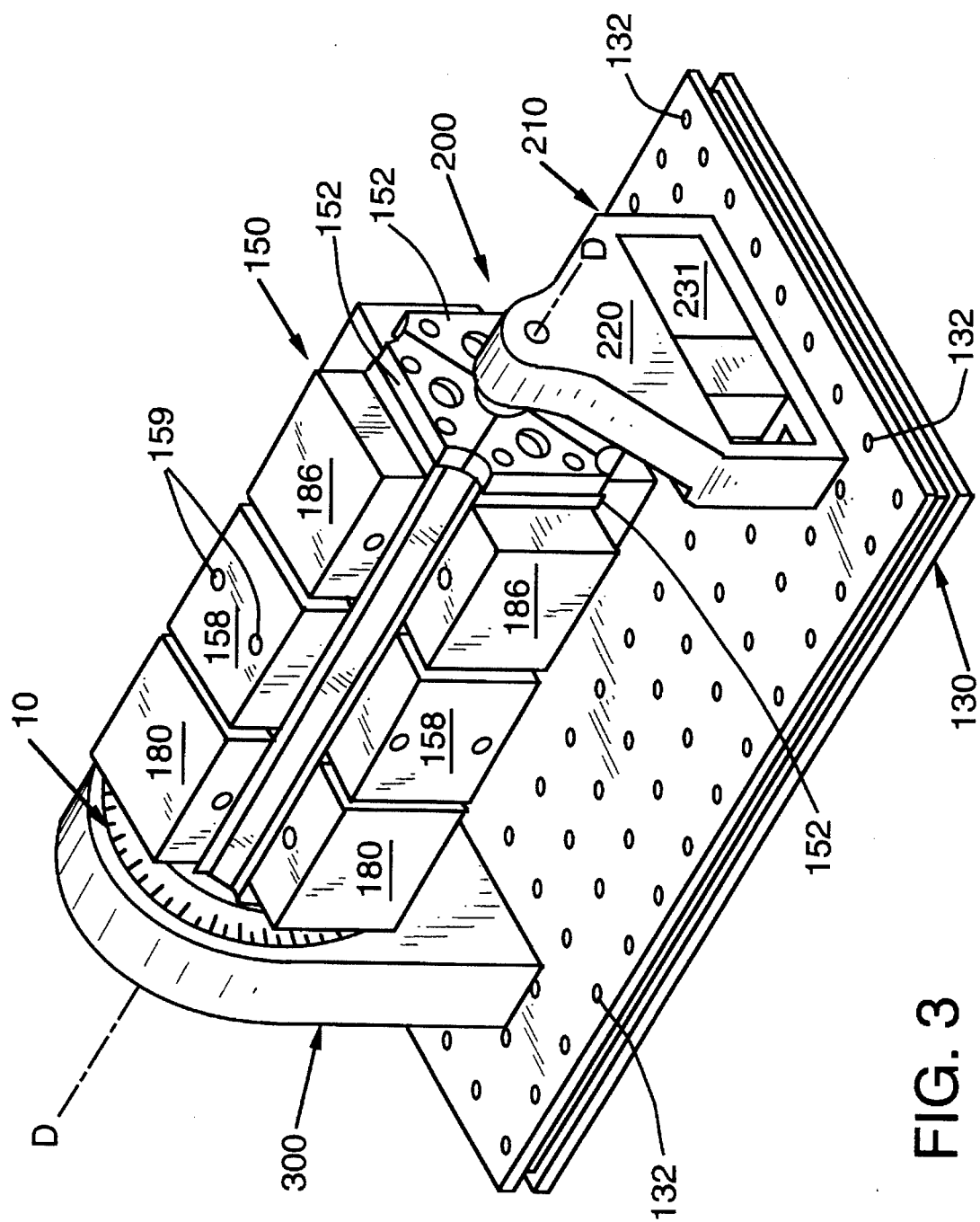
FIG. 3 is an isometric view of a preferred indexable device of the present invention supporting a preferred workholding assembly on an apertured grid plate.

More particularly and with reference to FIG. 3, the workholding assembly preferably comprises a column member 150 that is rotatably supported by an indexable support apparatus, collectively designated as 210, that comprises, among other things, a "first" upstanding support member 220 and a "second" upstanding support member 300 that houses an indexable device 10 of the present invention therein. The column 150 depicted in the present Figures comprises an elongated metallic structure typically fabricated from a high strength aluminum material having four longitudinal surfaces 152 thereon. The skilled artisan will readily appreciate, however, the indexable support assembly 210 of the present invention can be used to support columns of various other shapes and constructions without departing from the spirit and scope of the present invention.

Figure 9:
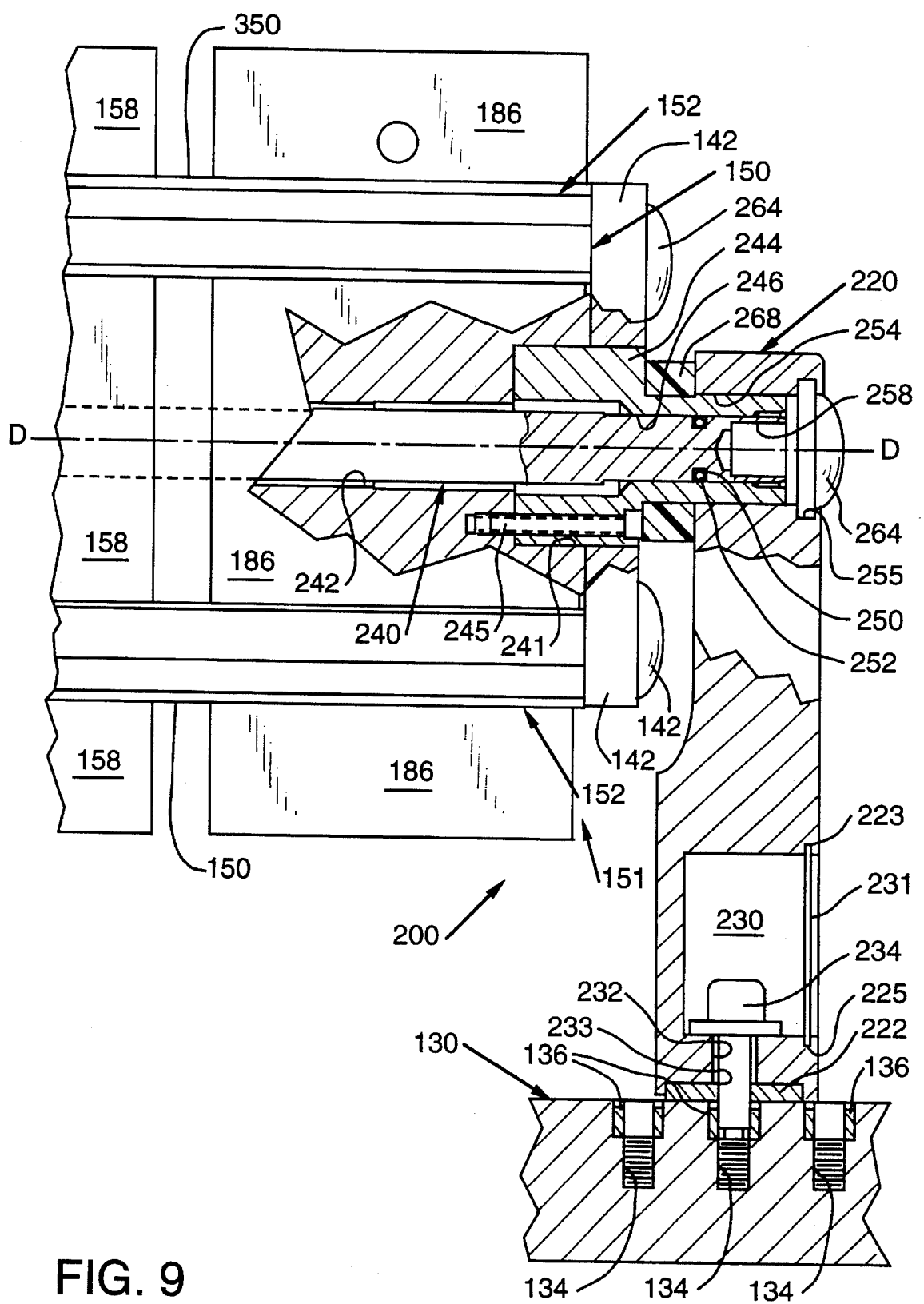
FIG. 9 is a partial cross-sectional assembly view of a column received on a preferred front support member of an indexable workholding apparatus of the present invention showing some of the elements thereof in full view for clarity.
Figure 10:
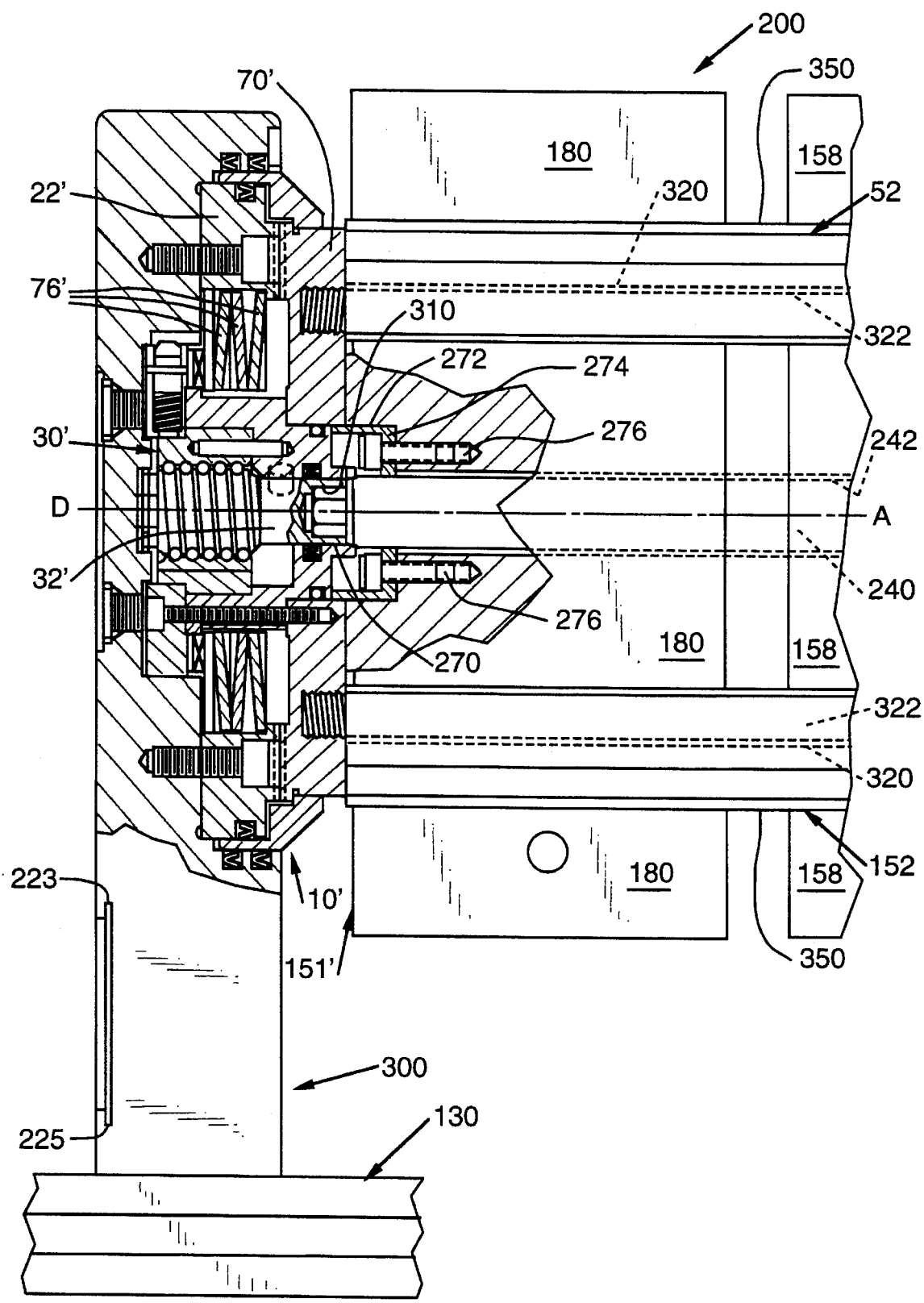
FIG. 10 is a partial cross-sectional assembly view of a column received on a preferred rear support member, with some of the elements thereof shown in full view for clarity.

As can be seen in FIGS. 3, 9, and 10 the column 150 has a longitudinal axis "D—D" about which it can be selectively rotated. A longitudinally extending cavity 154 having a longitudinal axis "E—E" is preferably provided in each surface 152 of the column 150 such that each axis "E—E" is substantially parallel to axis "D—D". See FIG. 4. Each longitudinal cavity 154 defines a corresponding slot 156 having two longitudinally extending side rail members 157. See FIG. 8. In addition, a corresponding clamping assembly, generally designated as 160, is provided for longitudinal movement within each cavity 154. The clamping assemblies 160 are preferably of the type disclosed in U.S. Pat. No. 5,024,427, the disclosure of which is herein incorporated by reference. In addition, in this embodiment, the clamping assemblies 160 are preferably identical in construction. As such, a single clamping assembly will be herein described with it being understood that all of clamping assemblies 160 are of identical construction.

In general, a clamping assembly 160 preferably comprises a first movable support member 162 and a second movable support member 168 which are each adapted to be received within a corresponding slot 156 in the column 150. See FIG. 7. The clamping assembly 160 also preferably includes a screw shaft 174 that is sized to be received within a corresponding slot 156 in the column member 150. The screw shaft 174 preferably has threads 176 which are intended to engage a threaded bore 163 within the first movable support member 162. In addition, the screw shaft 174 includes means (not shown) for engaging and displacing the second movable support member 168 thereon. The screw shaft 174 passes through the second movable support member 168 while the other end of the screw shaft 174 is configured to receive an allen wrench or other apparatus for selectively supplying rotary motion to the screw shafts 174 received within the cavities 154 of the column 150.

A "first" center jaw 158 is preferably attached to each surface 152 intermediate the column ends in a predetermined position. In a preferred embodiment, each center jaw 158 is removably attached to its corresponding surface 152 by cap screws 159 that extend through corresponding bores 161 in the center jaw member 158. Preferably, locating bushings 175 are pressed into corresponding bores in each surface 52 and are coaxially arranged with threaded bores (not shown) in the column 150. One locating bushing 175 preferably has a round aperture therethrough and the other locating bushing 175 preferably has an elongated "slot" therethrough. The bushings 175 are adapted to receive therein the shoulder portions of corresponding capscrews 159 to precisely locate the center jaw 158 on the surface 152. Other locating pin arrangements that are known in the art may also be used to precisely locate each center jaw member 158 on a corresponding surface 152 of the column 150. For example, the locating arrangement such as the one disclosed in a co-pending U.S. Patent Application entitled "Apparatus For Positioning An Element On A Surface", Ser. No. 08/300,375, filed Sep. 2, 1994, owned by the owner of the present application, the disclosure of which is herein incorporated by reference, may also be used in those instances wherein it is desirable to have each center jaw 158 precisely located on and attached to each surface 152 of column 150.

Figure 7:
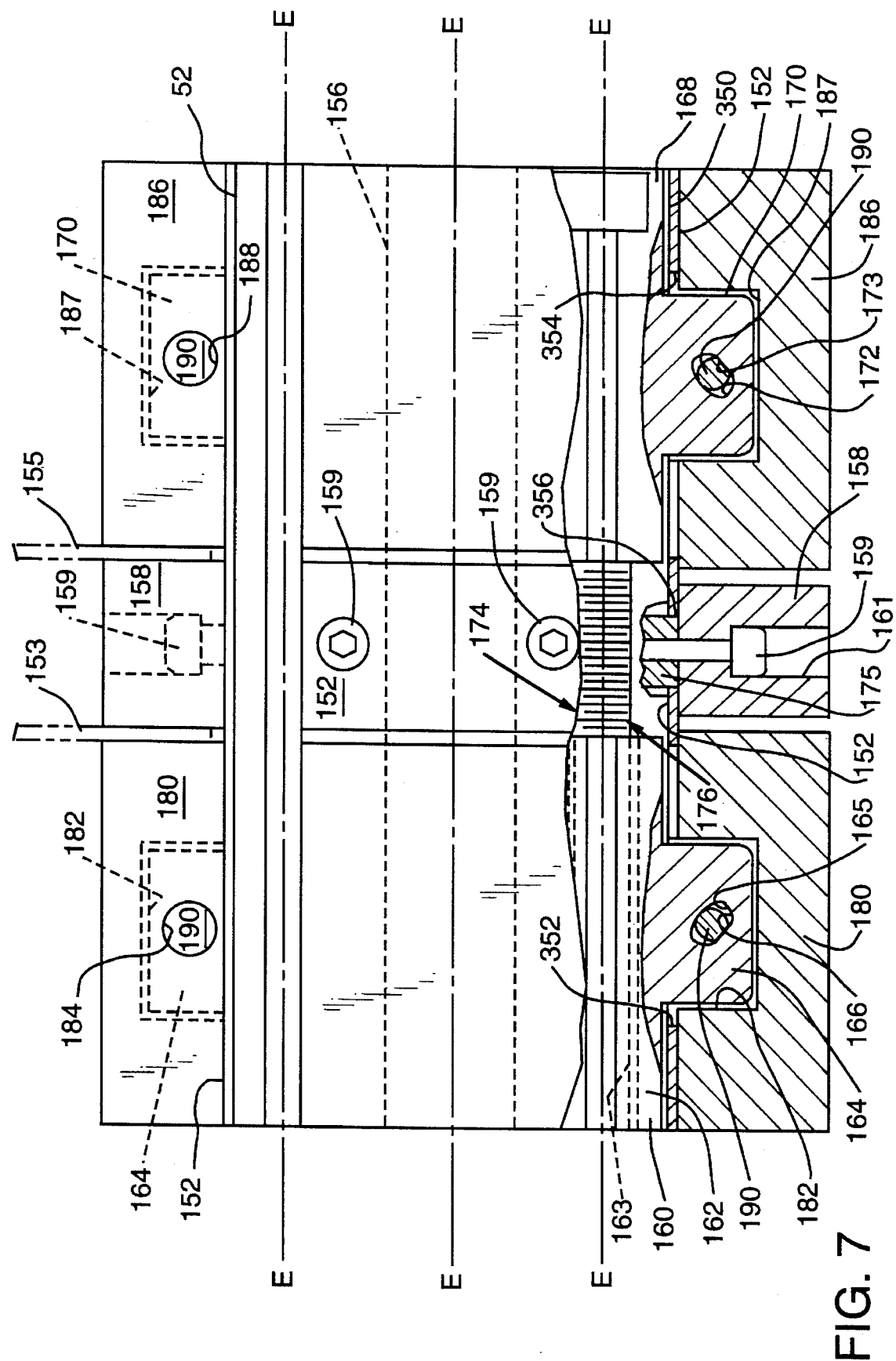
FIG. 7 is a partial cross-sectional side elevational view of a column member of an indexable workholding assembly, with some of the elements thereof shown in full view for clarity.
Figure 8:
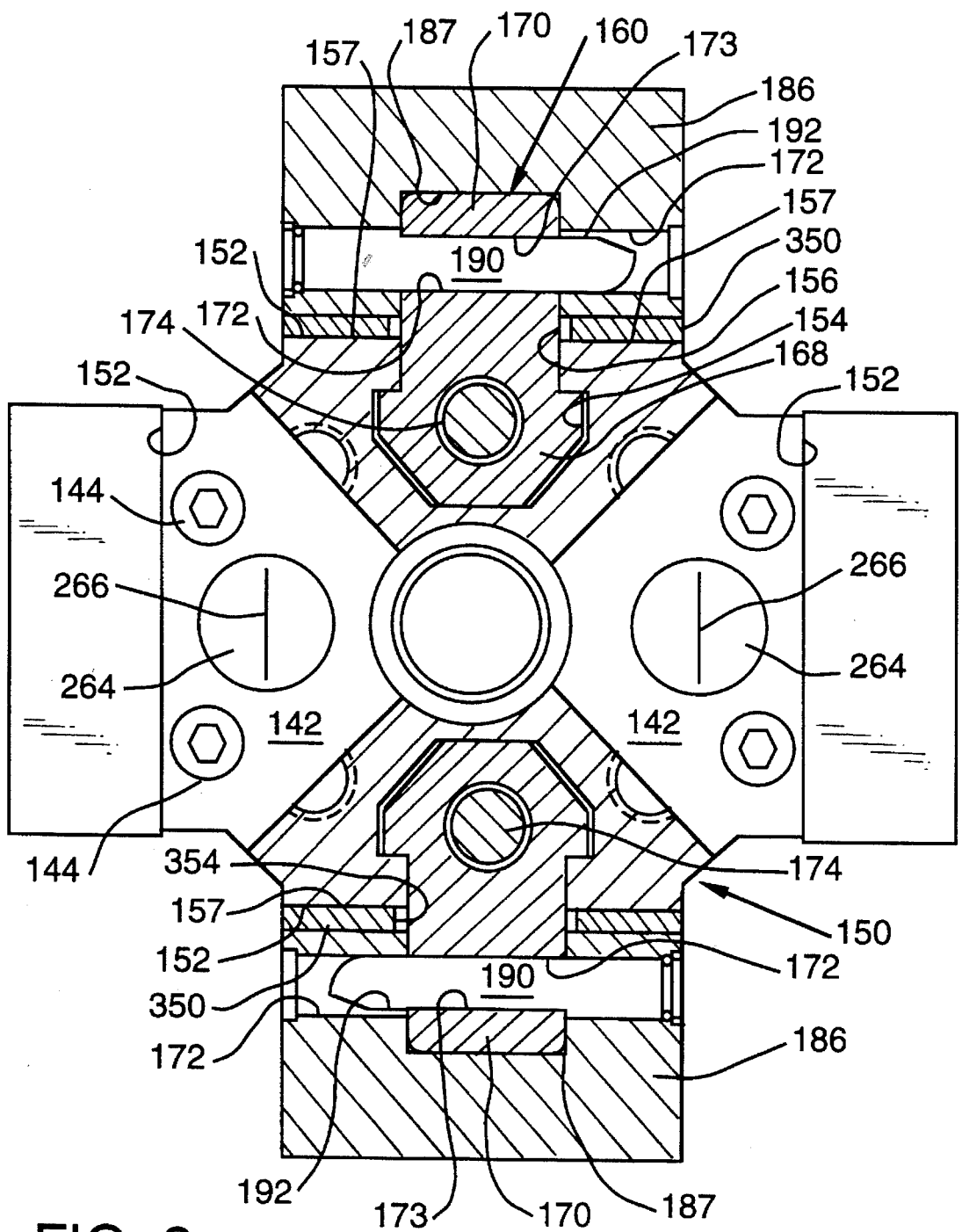
FIG. 8 is an end elevational view of the column of FIG. 6 with some of the elements thereof in cross-section.

As shown in FIG. 7, a "first" jaw member 180 corresponds with each first movable support member 162 and is preferably removably attached thereto. Similarly, a second jaw member 186 corresponds with each second movable support member 168 and is removably attached thereto. The jaw members (180, 186) are preferably similar to those workholding jaw portions disclosed in U.S. Pat. No. 5,025,427 entitled "Quick Change Head For Precision Machine Vise" the disclosure of which is also herein incorporated by reference. As such, in the present "Detailed Description Of Preferred Embodiments", the basic jaw structure of each clamping assembly 160 will be described in general terms, it being understood that the particular details of the jaw member construction, with the exception of those features which are described hereinbelow forming these embodiments of the present invention, may be gleaned from a review of that patent.

In general, as can also be seen in FIG. 7, each first movable support member 162 has a "first" extended portion 164 that extends above the corresponding surface 152. The first extended portion 164 has a "first" transverse bore 165 extending therethrough that has a "first" flat surface 166 machined therein. Similarly, each second movable support member 168 has a "second" extended portion 170 that extends above the corresponding surface 152. The second extended portion 170 has a "second" transverse bore 172 that extends therethrough that has a "second" flat surface 173 machined thereon. In addition, each first jaw member 180 preferably has a "first" cavity 182 therein that is sized to receive a "first" extended portion 164 of a corresponding first movable support member 162. A "primary" transverse bore 184 is preferably provided through the first jaw member 180 such that the primary transverse bore 184 will be substantially coaxially aligned with the first transverse bore 165 when the first extended portion 164 is received within the first cavity 182 in the first jaw 180. See FIG. 7. Also, each second jaw member 186 preferably has a "second" cavity 187 therein that is sized to receive a second extended portion 170 of a corresponding second movable support member 168. Also, a "secondary" transverse bore 188 is preferably provided through the second jaw member 186 such that the secondary transverse bore 188 will be substantially coaxially aligned with the second transverse bore 172 when the second extended portion 170 is received within the second cavity 187 in the second jaw member 186.

The first jaw members 180 are preferably removably attached to their corresponding first movable support members 162 and the second jaw members 186 are preferably removably attached to their corresponding second movable support members by removable pins 190. The preferred construction of pins 190 is set forth in detail in U.S. Pat. No. 5,024,427, the disclosure of which was incorporated by reference hereinabove. In general terms, however, each pin 190 has a planar portion 192 which is adapted to be brought into contact with the flat surfaces (166, 173) in bores (165, 172). In particular, each first jaw 180 is preferably removably attached to a corresponding first movable support member 162 by inserting a corresponding pin 190 through the coaxially aligned bores 184 and 165 such that the planar portion 192 of the pin 190 engages the first flat surface 166 of the first transverse bore 165. Similarly, each second jaw 186 is preferably removably attached to a corresponding second movable support member 168 by inserting a corresponding pin 190 through the coaxially aligned bores 188 and 172 such that the planar portion 192 of the pin 190 engages the second flat surface 173 of the second transverse bore 172.

As can be seen in FIG. 7, each center jaw 158 is arranged on a corresponding surface 152 of the column 150 such that the corresponding first and second movable support members (162, 168) may move toward and away from the corresponding center jaw member 158 to cause, for example, workpieces 153 and 155 to be clamped between the center jaw 158 and first and second jaws (180, 186). For example, when a screw shaft 174 is rotated, the first movable support member 162 is moved relative to the center jaw 158, thereby causing the first jaw 180 to move toward the center jaw 158 to clamp a first workpiece 153 therebetween. In addition, the rotation of the screw shaft 174 and its movement relative to the first movable support member 162 causes the second movable support member 168 to move toward the center jaw member 158 to cause the second jaw member 186 to engage and restrain a second workpiece 155 between the second jaw member 186 and the center jaw member 158.

Also, a debris shield 350, is preferably positioned between the surface and the corresponding first and second jaw members (180, 186) to prevent chips and debris from entering the longitudinal cavities 154. Preferably, the debris shield 350 has a first opening 352 therein adapted to receive a corresponding first extended portion 164 and a second opening 354 therein adapted to receive a corresponding second extended member 168. In addition, debris shield 350 has bores 356 adapted to receive bushings 175 therein. Debris shield 350 is preferably fabricated out of tool steel having a Rockwell hardness of approximately 50 (C scale). It will be appreciated that when the debris shield 350 is received on a corresponding surface 152 as shown in FIG. 7, the clamping assembly 160 is longitudinally retained within its corresponding cavity 154 by virtue of the debris shield's engagement with the bushings 175 in cooperation with the openings (352, 354) in the debris shield 350. It will be appreciated that openings (352, 354) are sized relative to the first and second jaw members (180, 186) such that regardless of where the first and second jaw members (180, 186) are located, the openings (352, 354) are always covered to prevent any debris from entering the longitudinal cavity 154.

Figures 4, 5, 6:
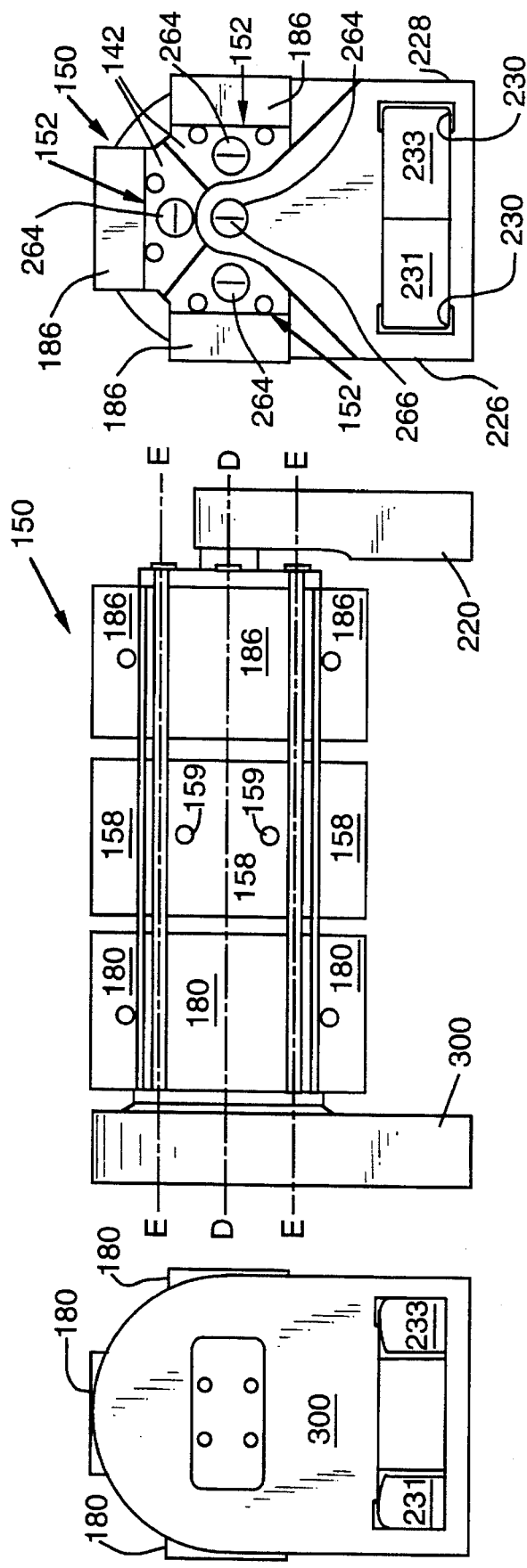
FIG. 4 is side elevational view of the indexable workholding assembly of FIG. 3.
FIG. 5 is an end elevational view of the front end of the indexable workholding assembly of FIG. 4.
FIG. 6 is an end elevational view of the opposite end of the indexable workholding assembly of FIGS. 4 and 5.

As mentioned above, the column member 150 is rotatably supported on an indexable support assembly 210 that comprises a first upstanding support member 220 and a second upstanding support member 300 that are attachable to a grid plate 130. The first support member 220 is preferably fabricated from aluminum in the shape shown in FIGS. 3 and 9. However, the reader will appreciate that the first support member 220 can be fabricated from other suitable materials in various other shapes. Preferably, the first support member 220 has a lower support plate 222 attached thereto that is designed to support the first support member 220 on a grid plate 130 that has a plurality of bores 132 therein arranged in a predetermined array of orthogonally arranged rows and columns. "Tooling" or "grid" plates of this type are known in the art and, therefore, will not be discussed in great detail herein. However, in this embodiment, each bore 132 in the grid plate 130 preferably has a lower threaded portion 134 and a locating bushing 136 pressed therein that is fabricated from hardened tool steel. See FIG. 7. As can be seen in FIG. 5, the opposing lower ends (226, 228) of the first support member 220 are each preferably provided with a fastener cavity 230. Each fastener cavity 230 has a fastener bore 232 therein that is coaxially aligned with a corresponding very accurately sized bore 232 in the support plate 222. See FIG. 9. Preferably, a locating screw 234 having a very accurately ground locating shoulder is inserted through the fastener bores (232, 233) to be threadedly received in corresponding threaded bores 134 in the grid plate 130. It will be appreciated that the shoulder portion of the screw 234, in cooperation with the bushing 136, serves to accurately locate the first support member 220 on the grid plate 130. Such locating and fastening method advantageously permits the workholding assembly 200 to be slidably positioned on the grid plate 130 during the initial orientation thereof. Furthermore, those of ordinary skill in the art will appreciate that by locating the locating screws 234 inside of the first support member 220, the fasteners and the support member are less susceptible to damage than other prior designs. This method of locating and attaching the first support member 220 to the grid plate 130 is also preferably used to attach the second support member 300 to the grid plate 130. The skilled artisan will further appreciate, however, that the first and second support members (220, 300) can be attached to a grid plate or other member in precise relationship to one another by a myriad of other known locating and fastening methods and apparatus without departing from the spirit and scope of the present invention. For example, the apparatus disclosed in the copending U.S. Patent Application entitled "Apparatus for Positioning An Element On A Surface", Ser. No. 08/300, 375, that was mentioned above and herein incorporated by reference may also be successfully used to attach the first and second support members (220, 230) of the present invention to a grid plate 130 in predetermined orientations.

To prevent chips and debris from entering fastener cavities 230, while providing a means for accessing the capscrews 234, slidable chip covers (231, 233) are slidably and overlappingly received in corresponding receiving slots (223, 225). To gain access to the capscrews 234, the chip covers (231, 233) are simply slidably displaced within the grooves (223, 225).

As can be seen in FIG. 9, a support shaft 240 is rotatably received within an axial bore 242 in the "front" end 151 of column 150 and is rotatably attached thereto by a shaft bushing 244. Shaft bushing 244 is preferably fabricated from bronze and is adapted to be non-rotatably received within a cavity 241 in the front end 151 of column 150. Preferably, shaft bushing 244 is rigidly attached to column 150 by a plurality of (preferably four) capscrews 245 and has an axial shaft receiving bore 246 in which shaft 240 is rotatably supported. To prevent debris from infiltrating between the shaft 240 and the shaft bushing 244, shaft 240 is preferably provided with an annular groove 250 adapted to receive therein a commercially available resilient wiper member 252.

Shaft bushing 244 is also adapted to be rotatably received within a corresponding bore 254 provided in the upper portion of first support member 220. As can be seen in FIG. 9, the end of shaft 240 is preferably provided with a hexagonally shaped cavity 258 to receive a standard allen wrench or other tool to provide rotation to shaft 240 and ultimately to the ball screw shaft 32 to thereby cause column 150 to rotate about longitudinal axis "D—D". To prevent chips and debris from entering bore 254, an annular groove 255 is provided in the first support member 220 to retain a resilient endcap member 264 as shown in FIG. 9. End cap member 264 is preferably fabricated from rubber or similar material and has an access slit 266 therein through which an allen wrench or other suitable tool may be inserted. See FIG. 5. Also, to prevent chips and debris from entering the cavities 154 in the column 150, a plurality of end plate segments 142 are attached to the front end 151 of column 150 by capscrews 144 in the manner depicted in FIG. 8. Each end plate segment 142, preferably has an axial bore therethrough (not shown) that provides operational access to the end of the corresponding screw shaft 174. An endcap member 264 is also preferably attached to each end plate segment 142 to prevent chips and debris from accumulating in those axial bores. In a preferred embodiment, all but one of the endcap members 264 that are attached to the endplates 142 are similarly colored. It will be appreciated that the "odd" colored endcap 164 indicates a "starting" or reference position to enable the operator to track the rotational position of the column member 150. Also, to further prevent chip and debris infiltration between the shaft bearing 244 and the bore 254 in the first support member 220, a resilient gasket member 268, preferably fabricated from foam rubber or similar material, is provided around shaft bearing 244 as shown in FIG. 9.

The other end of the shaft 240 protrudes from the opposite end 151' of the column 150 and preferably has a hexagonal wrench portion 270 formed thereon. A cavity 272 is provided in column end 151' such that it is substantially coaxially aligned with the shaft 240 along axis "D—D". An alignment ring 274 is coaxially aligned within cavity 272 as shown in FIG. 10. Preferably, alignment ring 274 is retained within the cavity 272 by corresponding capscrews 276 and is adapted to assist in the alignment and engagement of wrench portion 270 with the ball screw member 32' as will be discussed below.

The second upstanding support member 300 is preferably fabricated from aluminum and is essentially the same as the housing 11 discussed hereinabove and houses a preferred indexable device 10' of the present invention that is identical in construction and operation to the indexable device 10 discussed in detail above, except for the following noted preferred differences. In particular, the end of the ball screw member 32' is formed with a hexagonal shaped cavity 310 that is adapted to receive therein the hexagonally shaped end 270 of the shaft 240. It will be appreciated that the second upstanding support member is also preferably located on and attached to the grid plate 130 in the manner discussed above. The column member 150 is attached to the second toothed ring 70' by a plurality of (preferably four) elongated screw members 322 that pass through bores 320 in the column 150 to be threadedly received in corresponding threaded bores 71' in the second toothed ring 70'.

To index the column 150 about the longitudinal axis "D—D", a wrench or other suitable tool is inserted into hexagonal cavity 258 in the one end of shaft 240 and the shaft 240 is thereafter rotated clockwise to cause the second toothed gear to be axially displaced along axis "D—D" under the initial application of rotary force to the ball screw assembly 30'. Thereafter, the further application of rotary force to the ball screw assembly 30' causes the column 150 to be rotated to a desired angular position. The reader will appreciate that the indexing apparatus operates in the manner discussed above to selectively index the column 150 to a desired orientation. The reader will further appreciate that the rotational force required to index the column 150 may be provided by a number of other sources such as electric motors, hydraulic motors, etc. After the column 150 is indexed to the desired position, the rotary force is discontinued, permitting the toothed rings (22', 70') to re-engage under the axial force created by the Belleville springs 76'.

Figure 11:
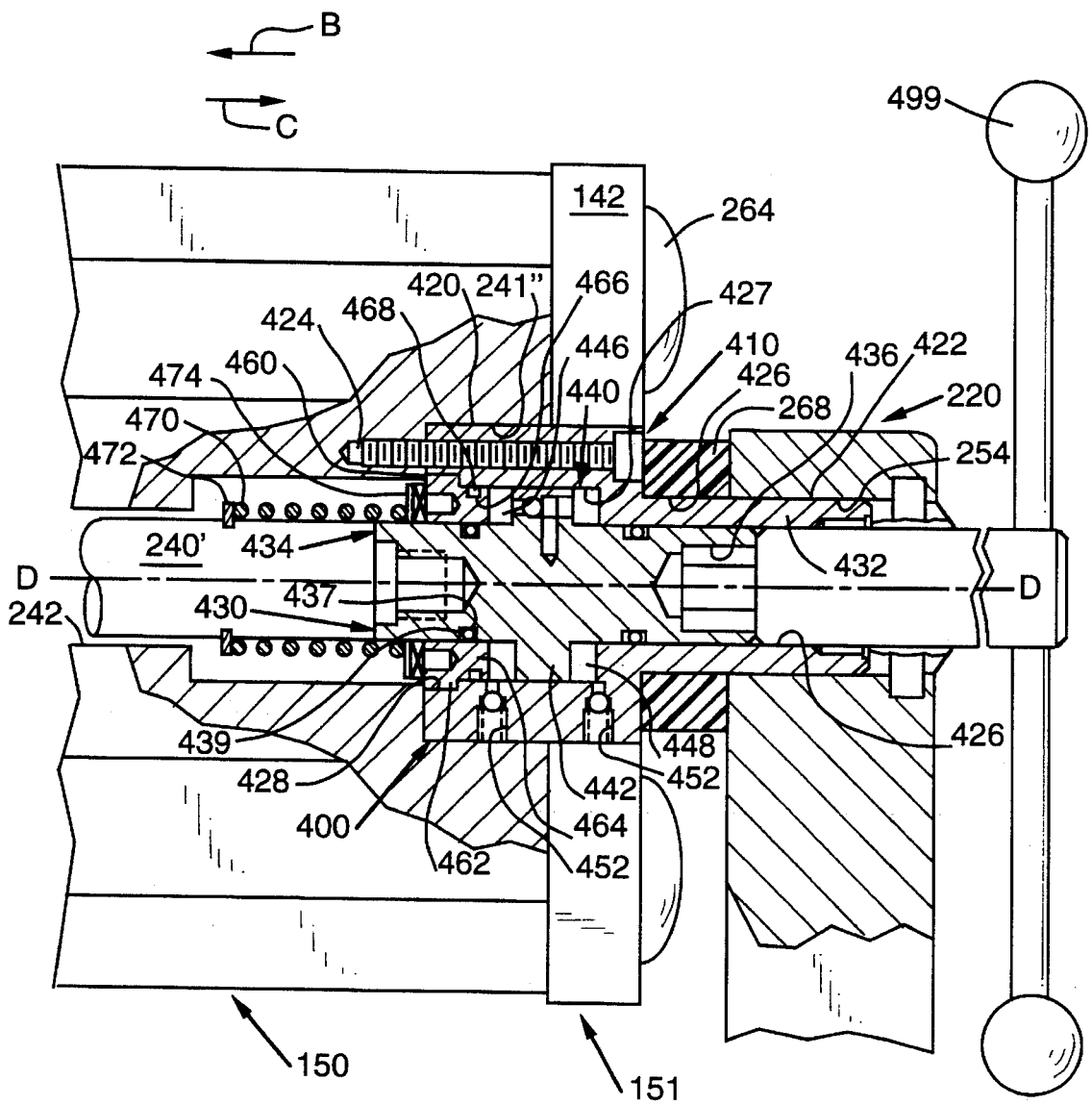
FIG. 11 is a partial cross-sectional view of a preferred damping apparatus and indexable workholding assembly of the present invention with the indexable apparatus thereof in an engaged position.
Figure 12:
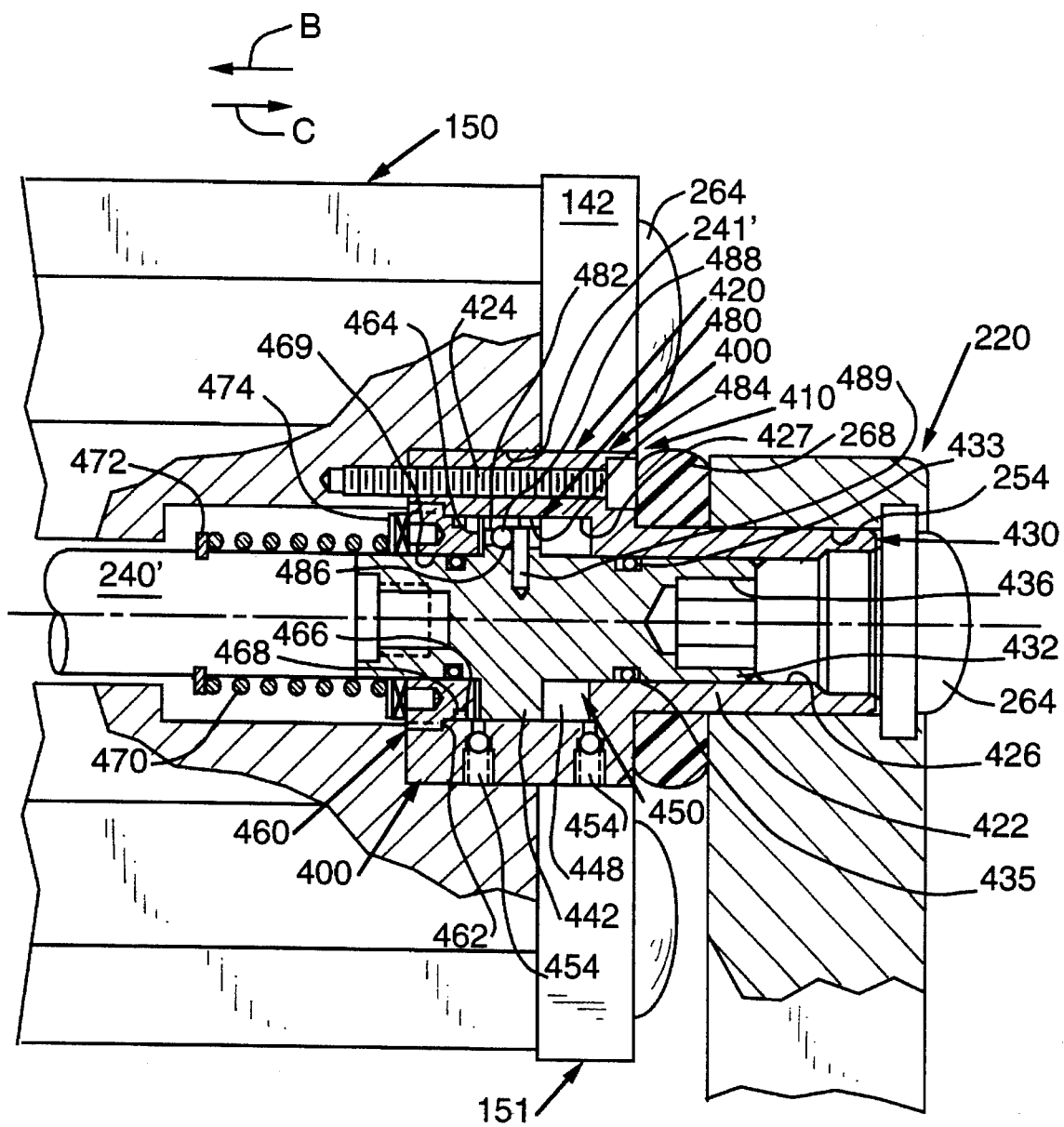
FIG. 12 is a partial cross-sectional view of the preferred damping apparatus and indexable workholding assembly of FIG. 11 with the indexable apparatus thereof in a disengaged position.

In yet another preferred embodiment as shown in FIGS. 11 and 12, the disclosed indexable workholding assembly 200 is provided with damping apparatus 400 that serves to damp the rotational and axial motion of the shaft 240' of the indexable apparatus 10 after the rotary actuation force has been discontinued. Such damping apparatus 400 is particularly advantageous when the rotary actuation force is manually applied because it permits the indexing apparatus 10 to return to an engaged position at a predetermined rate. Such "controlled re-engagement" of the indexing apparatus 10 also serves to control the axial and rotary motion of the hand wrench, wheel or other tool used to apply the rotary actuation force after that force has been discontinued.

Except for the differences noted below, support shaft 240' of this embodiment has the same attributes and functions of shaft 240 that were described in detail above. In this embodiment, the support shaft 240' is rotatably received within an axial bore 242 that extends through the column 150 such that it can operably engage the ball screw member 32' in the manner described above. The support shaft 240' is also rotatably supported on the first upstanding support member 220 by a piston and stub shaft assembly generally designated as 410. The piston and stub shaft assembly 410, in a preferred form, comprises a stub shaft 420 and a piston member 430. The stub shaft 420 preferably has an outwardly extending axial portion 422 that is sized to be rotatably received in bore 254 in the first upstanding support member 220. Stub shaft 420 is preferably fabricated from bronze and is adapted to be non-rotatably received within a cavity 241' in the front end 151 of column 150. Preferably, stub shaft 420 is rigidly attached to column 150 by a plurality of (preferably four) capscrews 424 and has three coaxially aligned bores (426, 427, 428) therein.

The piston member 430 has a first axial portion 432 that is axially and rotatably received in bore 426 of the stub shaft 420. The second end 434 of piston member 430 is non-rotatably attached to the support shaft 240', preferably by a threaded connection secured with a commercially available adhesive. The skilled artisan will readily appreciate, however, that the axial shaft 240' and piston member 430 can be fabricated as one unitary member using known machining methods and techniques. In this embodiment, the first axial portion 432 of piston member 430 is preferably provided with a hexagonally shaped cavity 436 sized to receive a standard wheel 499, wrench or other tool having a hexagonally shaped extended portion to provide rotation to the piston member 430 and shaft 240' and ultimately to the ball screw shaft 32' to thereby cause column 150 to rotate about longitudinal axis "D—D".

In this embodiment, a retaining cap 460 is coaxially and threadedly received within bore 428 in stub shaft 420. Retaining cap 460 has a flanged portion 462 and an axial portion 464. In a preferred embodiment, bore 428 of stub shaft 420 is threaded (not shown) to threadedly receive the flange portion 462 of the retaining cap 460 therein. The axial portion 464 is sized to be coaxially received within bore 427 of stub shaft 420. Axial portion 464 is also preferably provided with a perimetrical groove 466 that is sized to receive an O-ring 468 therein. In addition, retaining cap 460 has an axial bore 469 therethrough that is sized to slidably receive the axial shaft 240' such that the retaining cap 460 can be slidably displaced on axial shaft 240'. As will be discussed in further detail below, axial portion 464 of retaining cap 460, in cooperation with bore 427 of the stub shaft 420, serves to define an annular piston cavity 440 that extends around the piston member 430.

As can also be seen in FIGS. 11 and 12, a compression spring 470 can be advantageously employed to urge the hexagonally shaped end 270 of axial shaft 240' into the corresponding hexagonally shaped cavity 310 in the ball screw 32'. In this embodiment, the compression spring 470 is received between a retaining washer 472 that is non-movably attached to the axial shaft 240' and a thrust bearing 474 that abuts the retaining cap 460. The skilled artisan will appreciate that such compression spring arrangement serves to urge the axial shaft 240' in the "B" direction which also serves to maintain the hexagonally shaped end 270 of shaft 240' in engagement with the correspondingly shaped cavity 310 in the ball screw 32'. See FIG. 10.

As can be seen in FIGS. 11 and 12, piston member 430 is provided with a piston 442 that is sized to be slidably received within the piston cavity 440. Preferably, piston 442 is sized such that "0.003" of clearance is provided between the piston 442 and bore 427. Piston 442 divides the piston cavity 440 into two annular chambers (446, 448) that are adapted to receive a fluid damping medium, generally indicated as 450, therein. In a preferred embodiment, the damping medium 450 comprises a commercially available silicone grease such as Dow Corning Company High Vacuum Grease. As the present Detailed Description of Preferred Embodiments proceeds, the skilled artisan will appreciate that other damping mediums, may also be successfully employed.

The damping medium 450 is preferably admitted into piston chambers (446, 448) through corresponding ports 452 in the stub shaft 420. Ports 452 are each preferably threaded and are adapted to receive a conventional threaded plug member 454 therein. Those of ordinary skill in the art will appreciate that conventional grease fittings (not shown) may be threadedly attached to ports 452 to enable a conventional grease gun to be utilized to pump the damping medium 450 into chambers (446, 448).

In this embodiment, at least one check valve 480 is provided in piston 442 to control the flow of damping medium 450 between chambers (446, 448) which ultimately controls the axial and rotational motion of the piston 442 within the piston cavity 440. Check valve assembly 480, in a preferred form, comprises a first bore 482 in the piston 442. A second bore 484, coaxially aligned with the first bore 482, is also provided in piston 442 such that bores (482, 484) cooperate to form a passage through the piston 442. As can be seen in FIGS. 11 and 12, bore 484 is larger in diameter than first bore 482 and has a tapered portion 486 at its point of intersection with bore 482. A ball member 488, sized to be rollably received within bore 484, is provided such that when ball member 488 is forced in the "C" direction by the damping medium 450, the ball member 488 will achieve a substantially fluid-tight seal with the tapered portion 486 of the bore 484. Preferably, ball member 488 is retained within the bore 484 by a pin member 489 that is pressed into the piston 442 as shown.

The skilled artisan will appreciate that by varying the amount of clearance between the piston 442 and the first bore 427 and/or using different damping mediums, the speed at which the indexable apparatus 10 returns to the engaged position and, ultimately, the speed at which the axial shaft 240' also rotates after the rotary actuation force has been discontinued, can be controlled to a desired rate. For example, it has been determined that it takes approximately one second for the indexing apparatus 10 to return to an engaged position under the influence of an engagement force of approximately 2000 pounds after the rotary actuation force has been discontinued, when a clearance of approximately 0.003" is provided between the piston 442 and the bore 427 and silicone grease is used as a damping medium.

In a preferred embodiment, the axial portion 432 of the piston member 430 is provided with a perimetrical groove 433 that is adapted to receive an O-ring 435 therein. O-ring 435 serves to provide a substantially fluid-tight seal between the axial portion 432 of the piston member 430 and the stub shaft 420 while permitting the piston to slide axially and rotate within bore 426 of stub shaft 420. Similarly, the second end 434 portion of the piston member 430 has a perimetrical groove 437 that supports an O-ring 439 therein. O-ring 439 serves to achieve a substantially fluid-tight seal between the second end portion 434 of the piston member 430 and the retaining cap 460 while permitting the retaining cap 460 to slide axially and rotate on piston member 430.

FIG. 11 depicts the position of the retaining cap 460 on the piston member 430 when the indexable apparatus 10 is in an engaged position (e.g., prior to the application of a rotary actuation force to the axial shaft 240' in the manner described above). The skilled artisan will appreciate that when the indexable apparatus 10 is in the engaged position, the pressures within the piston chambers (446, 448), that are caused by the volume of damping medium 450 therein, are substantially equal. As was also discussed in detail above, the application of a rotary actuation force to the axial shaft 240' and, ultimately, to the indexable apparatus 10 causes the column 150 to be advanced axially in the "C" direction along axis D—D. Such axial advancement of the column 150 causes the retaining cap 460 to also be axially advanced in the "C" direction on the piston member 430. As can be seen in FIG. 12, such axial advancement of the retaining cap 460 on the piston member 430 causes the damping medium 450 that was in chamber 446 to be forced into chamber 448 by flowing between the ball 488 and the tapered portion 486 of bore 484. When the rotary actuation force is discontinued, the column member 150, under the influence of the Belleville springs 76 in the manner discussed above, is axially advanced in the "B" direction. Such axial advancement also causes the retaining cap 460 to move in the "B" direction and the piston member 430 to rotate counterclockwise. However, as the retaining cap 460 moves in the "B" direction and the volume of chamber 448 decreases, pressure is generated in chamber 448 which causes the ball member 488 to sealingly engage the tapered portion 486 of the bore 484. Such pressure forces the damping medium 450 through the clearance between the piston 442 and bore 427 of the stub shaft 420. Those of ordinary skill in the art will appreciate that as the damping medium 450 passes through that clearance, it damps the axial and rotary motion of the piston 442 in the "B" and counterclockwise directions, respectively, to a predetermined rate.

Figure 13:
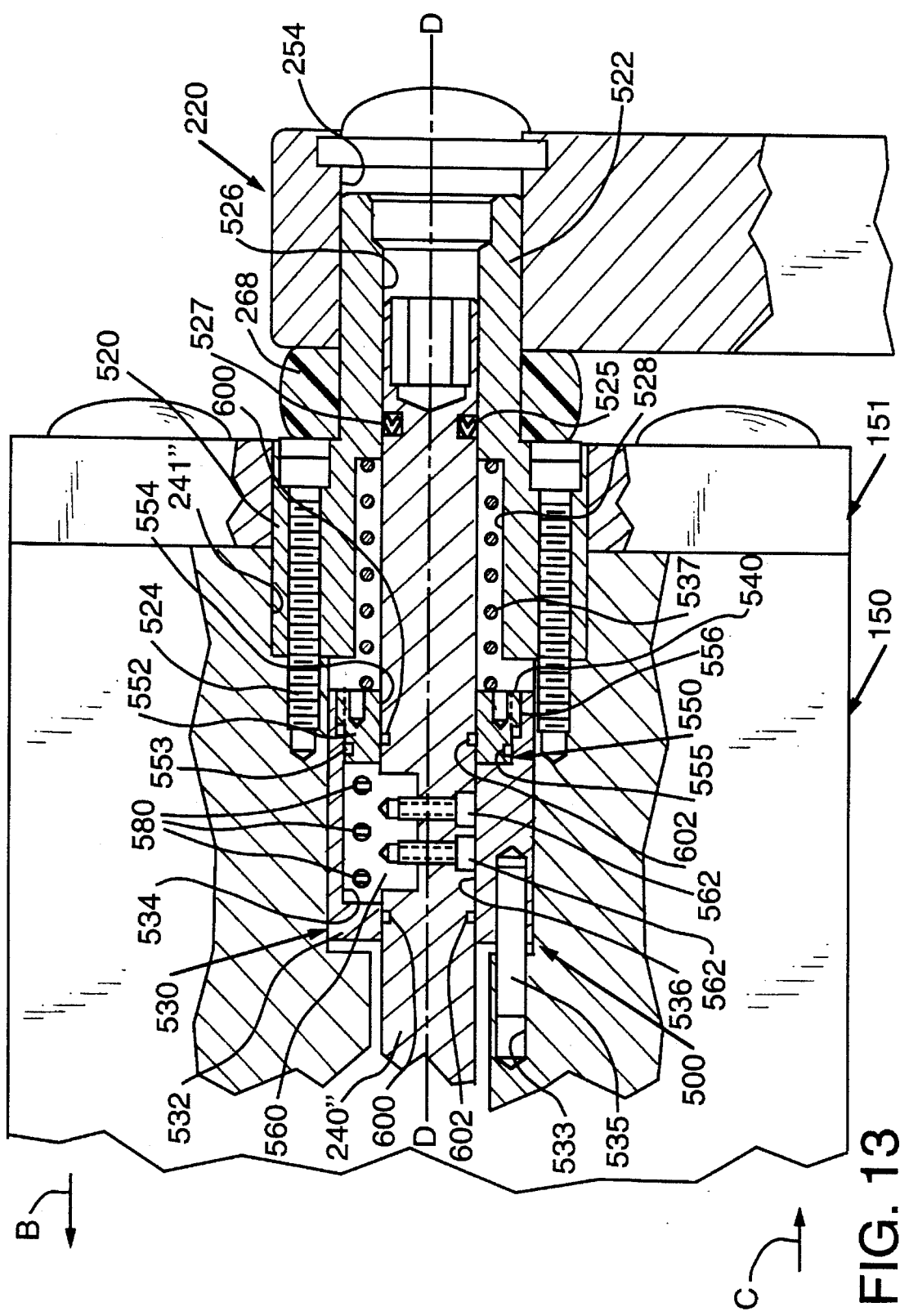
FIG. 13 is a partial cross-sectional view of another alternative embodiment of the damping apparatus of the present invention with indexable workholding assembly in a disengaged position.
Figure 14:
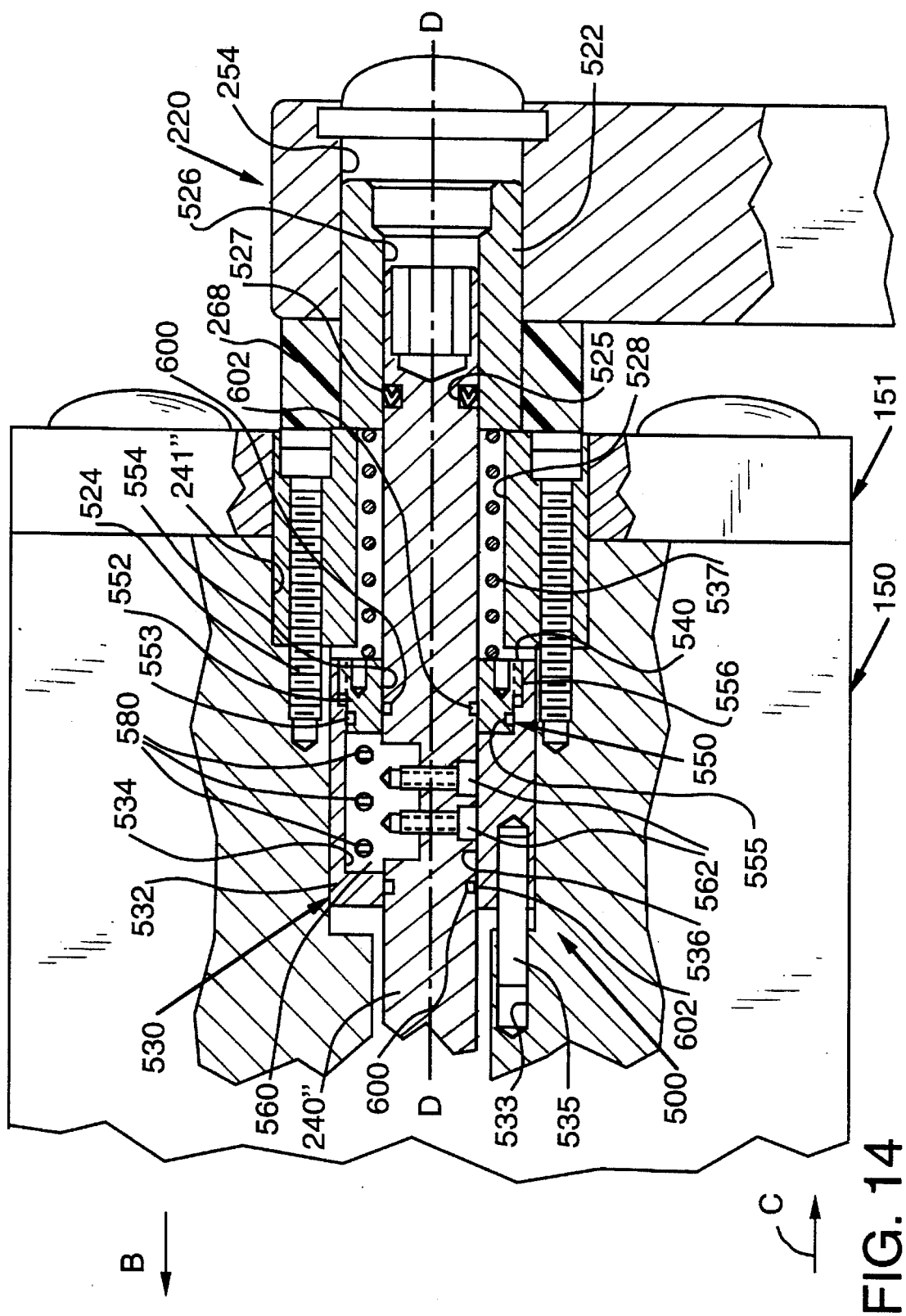
FIG. 14 is a partial cross-sectional view of the damping apparatus of FIG. 13 with the workholding assembly in an engaged position.
Figure 15:
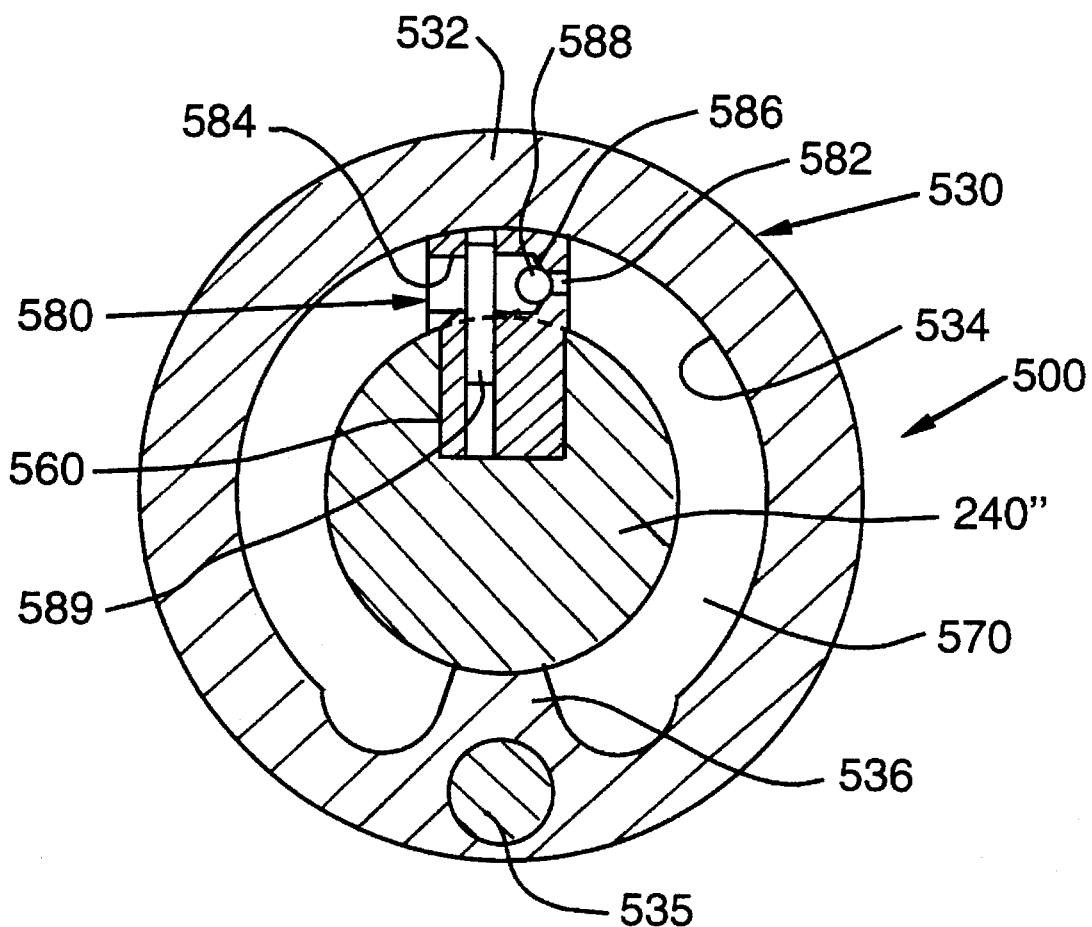
FIG. 15 is a cross-sectional view of a preferred rotary damper of the damping apparatus of FIG. 13.

In another embodiment, a rotary dashpot assembly, generally designated as 500 is employed to damp the rotary and axial motion of the indexable apparatus 10 after the rotary actuation force has been discontinued. As can be seen in FIGS. 13–15, the rotary dashpot assembly 500 preferably comprises a stub shaft member 520 and a rotary damper assembly 530. In this embodiment, the stub shaft 520 has an outwardly extending axial portion 522 that is sized to be rotatably and slidably received in bore 254 in the first upstanding support member 220. Stub shaft member 520 is preferably fabricated from bronze and is adapted to be non-rotatably received with a cavity 241" in the front end 151 of column 150. Preferably, stub shaft 520 is rigidly attached to the column 150 by a plurality of (preferably four) capscrews 524.

As can be seen in FIGS. 13 and 14, stub shaft 520 has a bore 526 that is sized to slidably and rotatably support axial shaft 240" therein. Except for the differences noted below, axial shaft 240" has the same attributes as shaft 240 that were described in detail above. Stub shaft 520 also preferably has a second bore 528 that is larger in diameter than bore 526 and is coaxial therewith. To prevent dirt and debris from infiltrating into column 150, axial shaft 240" is preferably provided with a perimetrical groove 525 that houses a commercially available wiper member 527 therein.

The rotary dashpot assembly 500 preferably also comprises a housing member 532 that is non-rotatably attached to the column member 150 preferably by a pin 535 that is slidably received in a bore 533 in the column member 150 to enable the housing member 532 to be axially displaced within the column member 150. Housing member 532 is preferably configured as shown in FIGS. 13–15 and has first bore 534 extending therethrough that has an upstanding axial surface 536 that serves to rotatably and slidably support axial shaft 240" thereon. In addition, housing member 532 has threaded bore 540 therein that is adapted to threadedly receive a retaining cap 550. Retaining cap 550 preferably has an axial portion 552 and a bore 554 therethrough that is adapted to rotatably support axial shaft 240" therein. Retaining cap 550 also preferably has a flanged portion 556 that is adapted to threadedly engage the threaded bore 540 of the housing 532. In a preferred embodiment, a compression spring 537 is provided within bore 528 to bias the housing member 532 in the "B" direction within the column member 150.

As can also be seen in FIGS. 13–15, the rotary dashpot assembly 500 comprises a rotary vane member 560 that is attached to the axial shaft 240" preferably by cap screws 562. Rotary vane member 560 is sized such that it extends from the perimeter of axial shaft 240" to the surface of bore 534. In a preferred embodiment, a clearance of approximately 0.003" is provided between the vane 560 and the bore 534 to facilitate rotation of the axial shaft 240" within the bore 534.

To create the desired rotary damping effect, the first bore 534 of the housing 530 is filled with a damping medium, generally designated as 570. See FIG. 15. Preferably, damping medium 570 comprises petroleum base oil that has a viscosity of 68 centistokes; however, other damping mediums having different viscosities may also be successfully used. Vane 560 is preferably provided with at least one, and preferably three, check valve assemblies 580 as shown in FIGS. 13 and 14. A preferred check valve assembly 580 comprises two coaxial passages (582, 584) that extend through the vane 560 as shown in FIG. 15. Passage 584 is larger in diameter than passage 582 and has a tapered portion 586 at their point of intersection. A ball member 588 is movably received in passage 584 and is retained therein by a corresponding pin member 589.

In a preferred embodiment, to retain the damping medium within the housing member 532, a pair of perimetrical grooves 600 are provided in axial shaft 240" in the manner shown in FIGS. 13 and 14. Each groove 600 supports a corresponding commercially available O-ring 602 therein. In addition, the axial portion 552 of retaining cap 550 is preferably provided with a perimetrical groove 553 for receiving an O-ring 555 therein.

As was discussed above, to actuate the indexable workholding assembly 200, a rotary force is applied to the axial shaft 240" in the clockwise direction. The initial application of rotary force causes the column 150 to move axially in the "C" direction relative to the axial shaft 240" and thereafter to continue to rotate to the desired position. FIG. 13 illustrates the indexable apparatus of the workholding assembly in a "disengaged position". When the shaft 240" is being rotated in the clockwise direction, the damping medium 570 can pass through the passages (582, 584) in the check valve assemblies 580. After the rotary actuation force has been discontinued, the Belleville springs 76' urge the second toothed ring 70' to re-engage the first toothed ring 22' and cause the shaft 240" to rotate in the counterclockwise direction and to move axially in the "B" direction relative to the column member 150 to enable the indexable apparatus to assume the engaged position as shown in FIG. 14. As the shaft 240" is urged in the counterclockwise direction, the damping medium 570 passes into passages 584 of the check valve assemblies and forces the ball members 588 into sealing engagement with the tapered portion 586 of their corresponding passage 584 thus preventing the damping medium 570 from passing therethrough. The damping medium 570 is therefore forced through the clearance between the vane 560 and the bore 534. The skilled artisan will appreciate that the forcing of the damping medium 570 through the clearance between the vane 560 and the bore 534 serves to slow or damp the rate in which the axial shaft 240" turns in the counterclockwise direction. It will be further appreciated that the damping rate can be controlled by altering the amount of clearance provided between the vane 560 and the bore 534 and/or by utilizing damping mediums that have different viscosities.

The above-disclosed indexable workholding assembly is just one of many applications in which the indexable device of the present invention can be advantageously used. The present indexable device can be used in numerous applications wherein an item or a collection of items must be very precisely indexed to positions about an axis and retained in those positions even under the influence of substantial external forces. The present indexable device is relatively compact and can be incorporated into various other support structures as desired. In addition, when compared to a number of other indexable apparatuses, the present indexable device is relatively inexpensive and easy to operate. Moreover, the present indexable apparatus can generate very high retaining forces while maintaining the ability to be indexed by the manual application of rotary actuation force thereto. Also, the present invention provides solutions to the aforementioned problems associated with indexable vise-like workholding apparatuses. While such advantages are apparent from the foregoing disclosure, it will be understood, however, that various changes in the details, materials and arrangements of parts which have been herein described and illustrated in order to explain the nature of the invention may be made by those skilled in the art within the principle and scope of the invention as expressed in the appended claims.

What is claimed is:

1. An indexable workholding apparatus comprising:

a longitudinal column member having a first longitudinal axis, said longitudinal column member operably supporting at least one pair of jaw members for selectively clamping at least one workpiece therebetween, each said pair of jaw members including at least one jaw member which is selectively movable along a corresponding second longitudinal axis that is substantially parallel to said first longitudinal axis;

a shaft member extending through said longitudinal column member such that said column member may be rotated and axially advanced relative thereto, said shaft member having means for receiving a rotary force;

at least one support member rotatably and axially supporting said longitudinal column member such that said shaft member and said longitudinal column member can be selectively axially and rotatably advanced about said longitudinal axis;

an indexing assembly attached to one said support member, said indexing assembly having a displacement means attached to said longitudinal column member and said shaft member for selectively moving said column member between engaged and disengaged positions, said displacement means selectively axially displacing said column member on said shaft member in a first longitudinal direction to said disengaged position upon the initial application of a rotary force to said shaft member, said displacement means permitting said column member and said shaft member to thereafter be selectively rotated in a first rotary direction to a predetermined angular position about said longitudinal axis upon the further application of said rotary force to said shaft member, said displacement means displacing said column member in a second axial direction along said shaft member and rotating said shaft member in a second rotary direction to permit said column member to be retained in said predetermined angular orientation by said indexing assembly when said further application of rotary force is discontinued; and damping means attached to said shaft member and said column member for damping said axial travel of said column member in said second axial direction and said rotation of said shaft member in said second rotary direction when the further application of rotary force is discontinued.

2. The indexable workholding apparatus of claim 1 wherein said damping means comprises:

a piston member attached to said shaft member for axial and rotational travel therewith, said piston member comprising a piston and shaft segments on the opposing sides thereof;

a stub shaft assembly attached to said column member for axial and rotational travel therewith, said stub shaft assembly defining an annular piston cavity surrounding said piston and being sized relative to said piston to create a predetermined amount of clearance therebetween such that said stub shaft assembly can be axially and rotationally displaced relative to said piston;

seal means between said piston member and said stub shaft assembly for achieving a substantially fluid-tight seal between said shaft segments and said stub shaft assembly;

a fluid damping medium within said piston cavity; and at least one flow restriction means attached to said piston to permit said damping medium to flow from one side of said piston to the other side of said piston through a corresponding passage therein when said stub shaft assembly is axially advanced in said first axial direction and for preventing said damping medium from flowing through said corresponding passage when said stub shaft assembly is axially advanced in said second axial direction thereby causing said damping medium to be forced through said predetermined amount of clearance between said piston and said stub shaft assembly to thereby damp the axial travel of said column in said second axial direction and said rotation of said shaft member in said second rotary direction when the further application of rotary force is discontinued.

3. The indexable workholding apparatus of claim 2 wherein each said flow restriction means comprises a check valve mounted in each said corresponding passage through said piston.

4. The indexable workholding apparatus of claim 2 wherein said sealing means comprises at least two O-rings supported on said shaft segments for sealing contact with said stub shaft assembly.

5. The indexable workholding apparatus of claim 1 wherein said damping means comprises:

a vane member attached to said shaft member for axial and rotational travel therewith;

a stub shaft assembly attached to said column member for axial and rotational travel therewith, said stub shaft assembly defining an annular piston cavity surrounding said vane member and being sized relative to said vane member to create a predetermined amount of clearance therebetween such that said stub shaft assembly can be rotationally displaced relative to said vane member;

seal means attached to said shaft member for achieving a substantially fluid-tight seal between said shaft member and said stub shaft assembly;

a fluid damping medium within said piston cavity; and at least one flow restriction means attached to said vane member to permit said damping medium to flow from one side of said vane member to the other side of said vane member through a corresponding passage therein when said stub shaft assembly is rotated in said first rotary direction and preventing said damping medium from flowing through said corresponding passage when said stub shaft assembly is rotated in said second rotary direction to thereby cause said damping medium to be forced through said predetermined amount of clearance between said vane member and said stub shaft assembly to thereby damp the axial travel of said column in said second axial direction and said rotation of said shaft member in said second rotary direction when the application of rotary force is discontinued.

6. The indexable workholding apparatus of claim 5 wherein each said flow restriction means comprises a check valve mounted in said corresponding passage through said vane member.

7. The indexable workholding apparatus of claim 5 wherein said sealing means comprises at least two O-rings supported on said shaft for sealing contact with said stub shaft assembly.

8. An indexable workholding apparatus comprising:

a longitudinal column member having a first longitudinal axis, said longitudinal column member operably supporting at least one pair of jaw members for selectively clamping at least one workpiece therebetween, each said pair of jaw members including at least one jaw member which is selectively movable along a corresponding second longitudinal axis that is substantially parallel to said first longitudinal axis;

a shaft member extending through said longitudinal column member such that said column member may be rotated and axially advanced relative thereto, said shaft member having means for receiving a rotary force;

at least one support member rotatably and axially supporting said longitudinal column member such that said shaft member and said longitudinal column member can be selectively axially and rotatably advanced about said longitudinal axis;

an indexing assembly attached to one said support member, said indexing assembly having a displacement means attached to said longitudinal column member and said shaft member for selectively moving said column member between engaged and disengaged positions, said displacement means selectively axially displacing said column member on said shaft member in a first longitudinal direction to said disengaged position upon the initial application of a rotary force to said shaft member, said displacement means permitting said column member and said shaft member to thereafter be selectively rotated in a first rotary direction to a predetermined angular position about said longitudinal axis upon the further application of said rotary force to said shaft member, said displacement means displacing said column member in a second axial direction along said shaft member and rotating said shaft member in a second rotary direction to permit said column member to be retained in said predetermined angular orientation by said indexing assembly when said application of rotary force is discontinued;

a piston member attached to said shaft member for axial and rotational travel therewith, said piston member comprising a piston and shaft segments on the opposing sides thereof;

a stub shaft assembly attached to said column member for axial and rotational travel therewith, said stub shaft assembly defining an annular piston cavity surrounding said piston and being sized relative to said piston to create a predetermined amount of clearance therebetween such that said stub shaft assembly can be axially and rotationally displaced relative to said piston;

sealing means attached between said piston member and said stub shaft for achieving a substantially fluid-tight seal between said shaft segments and said stub shaft assembly;

a fluid damping medium within said piston cavity;

at least one flow restriction means attached to said piston to permit said damping medium to flow from one side of said piston to the other side of said piston through a corresponding passage therein when said stub shaft assembly is axially advanced in said first axial direction and for preventing said damping medium from flowing through said corresponding passage when said stub shaft assembly is axially advanced in said second axial direction and causing said damping medium to be forced through said predetermined amount of clearance between said piston and said stub shaft assembly to thereby damp the axial travel of said column in said second axial direction and said rotation of said shaft member in said second rotary direction when the application of rotary force is discontinued; and a handle member removably attachable to said means for receiving a rotary force in said shaft member to enable said rotary force to be manually applied thereto.

9. An indexable workholding apparatus comprising:

a longitudinal column member having a first longitudinal axis, said longitudinal column member operably supporting at least one pair of jaw members for selectively clamping at least one workpiece therebetween, each said pair of jaw members including at least one jaw member which is selectively movable along a corresponding second longitudinal axis that is substantially parallel to said first longitudinal axis;

a shaft member extending through said longitudinal column member such that said column member may be rotated and axially advanced thereon, said shaft member having means for receiving a rotary force;

first and second support members rotatably and axially supporting said shaft member therebetween such that said shaft member and said longitudinal column member can be selectively axially and rotatably advanced about said longitudinal axis;

an indexing assembly attached to said second support member, said indexing assembly having a displacement means attached to said longitudinal column member and said shaft member for selectively moving said column member between engaged and disengaged positions, said displacement means selectively axially displacing said column member on said shaft member in a first longitudinal direction to said disengaged position upon the initial application of a rotary force to said shaft member, said displacement means permitting said column member and said shaft member to thereafter be selectively rotated in a first rotary direction to said predetermined angular position about said longitudinal axis upon the further application of said rotary force to said shaft member, said displacement means displacing said column member in a second axial direction along said shaft member and rotating said shaft member in a second rotary direction to permit said column member to be retained in said predetermined angular orientation by said indexing assembly when said application of rotary force is discontinued;

a vane member attached to said shaft member for axial and rotational travel therewith;

a stub shaft assembly attached to said column member for axial and rotational travel therewith, said stub shaft assembly defining an annular piston cavity surrounding said vane member and being sized relative to said vane member to create a predetermined amount of clearance therebetween such that said stub shaft assembly can be rotationally displaced relative to said vane member;

sealing means attached between said shaft member and said stub shaft assembly for achieving a substantially fluid-tight seal therebetween;

a fluid damping medium within said piston cavity;

at least one flow restriction means attached to said vane member to permit said damping medium to flow from one side of said vane member to the other side of said vane member through a corresponding passage therein when said stub shaft assembly is rotated in said first rotary direction and preventing said damping medium from flowing through said corresponding passage when said stub shaft assembly is rotated in said second rotary direction to thereby cause said damping medium to be forced through said predetermined amount of clearance between said vane member and said stub shaft assembly to thereby damp the axial travel of said column in said second axial direction and said rotation of said shaft member in said second rotary direction when the application of rotary force is discontinued; and a handle member removably attachable to said means for receiving a rotary force in said shaft member to enable said rotary force to be manually applied thereto.

* * * * *